(12) United States Patent
Bajj et al.

(10) Patent No.: US 9,084,165 B2
(45) Date of Patent: Jul. 14, 2015

(54) SYSTEMS AND METHODS FOR DEPLOYMENT OPERATIONS FOR SMALL CELLS IN SELF-ORGANIZING NETWORKS

(71) Applicant: Public Wireless, Inc., San Jose, CA (US)

(72) Inventors: Nart Bajj, Vancouver (CA); Brett Moser, Atascadero, CA (US); Zhanhe Shi, San Jose, CA (US)

(73) Assignee: Public Wireless, Inc., San Jose, CA (US)

( * ) Notice: Subject to any disclaimer, the term of this patent is extended or adjusted under 35 U.S.C. 154(b) by 0 days.

(21) Appl. No.: 14/044,738

(22) Filed: Oct. 2, 2013

(65) Prior Publication Data

US 2015/0092552 A1 Apr. 2, 2015

(51) Int. Cl.
*H04B 7/00* (2006.01)
*H04W 36/08* (2009.01)
*H04W 28/08* (2009.01)
*H04W 84/18* (2009.01)

(52) U.S. Cl.
CPC .............. *H04W 36/08* (2013.01); *H04W 28/08* (2013.01); *H04W 84/18* (2013.01)

(58) Field of Classification Search
CPC ......... H04L 2012/5608; H04W 84/12; H04W 88/08; H04W 80/04; H04W 88/06; H04W 84/18; H04W 74/08
USPC ...................................... 370/310.2, 328, 338
See application file for complete search history.

(56) References Cited

U.S. PATENT DOCUMENTS

| | | | |
|---|---|---|---|
| 7,013,146 B2 | 3/2006 | Wang et al. | |
| 8,630,648 B2* | 1/2014 | Rune et al. | 455/438 |
| 2007/0264996 A1* | 11/2007 | Vikberg | 455/426.1 |
| 2009/0323638 A1 | 12/2009 | Catovic et al. | |
| 2010/0173626 A1* | 7/2010 | Catovic et al. | 455/423 |
| 2011/0142004 A1* | 6/2011 | Bae et al. | 370/331 |
| 2012/0244898 A1* | 9/2012 | Guey et al. | 455/507 |
| 2013/0029670 A1* | 1/2013 | Lee | 455/444 |
| 2013/0225181 A1 | 8/2013 | Radulescu et al. | |
| 2013/0244718 A1* | 9/2013 | Lee et al. | 455/525 |

FOREIGN PATENT DOCUMENTS

| | | |
|---|---|---|
| EP | 2427029 A1 | 3/2012 |
| EP | 2453700 A1 | 5/2012 |

(Continued)

OTHER PUBLICATIONS

International Search Report and Written Opinion for related PCT/US2014/056820 mailed on Jan. 8, 2015 in 18 pages.

*Primary Examiner* — Brenda H Pham
(74) *Attorney, Agent, or Firm* — Levine Bagade Han LLP

(57) ABSTRACT

A multi-modal multi-modulation base station such as a small cell eNB is disclosed. The small cell eNB includes multiple radio devices that can be configured to communicate with user devices using different protocols and different frequencies. The small cell eNB also includes a sniffer module to detecting signal from other base stations. The small cell eNB include functions to automate deployment in a self-organizing network, such as network monitoring, neighbor peer discovery, processing of neighbor peer reports, automated transmit-power adaptation, processing of user equipment reports, physical cell identity selection, automatic neighbor relation, handover configuration, private access connections, load balancing, RACH preamble power control, RACH preamble set selection, RACH preamble splitting, PRACH configuration, and mobility robustness.

26 Claims, 20 Drawing Sheets

(56) References Cited

FOREIGN PATENT DOCUMENTS

| EP | 2480031 | A1 | 7/2012 |
| WO | 2010-002301 | A1 | 1/2010 |
| WO | 2011-020741 | A2 | 2/2011 |

* cited by examiner

SYSTEMS AND METHODS FOR DEPLOYMENT OPERATIONS FOR SMALL CELLS IN SELF-ORGANIZING NETWORKS

BACKGROUND

The present invention generally relates to the field of wireless communication systems and to systems and methods for deployment operations of small cells in self-organizing networks.

Growth in wireless communication continues to increase. Demand for data services with high data bandwidth requirements has led to the introduction of multiple modulation techniques for wireless communication, such as Long Term Evolution (LTE), LTE-Advanced, High-Speed Downlink Packet Access+ (HSDPA+), and CDMA2000 1xEV-DO (Evolution-Data Optimized or "EVDO"). Additionally, deployment of small cells such as picocells and femtocells has become increasingly desirable for providing coverage. Small cells may be deployed, for example, in areas having high user density, such as airports or event venues, or areas with poor coverage by macro base stations. A small cell base stations may have, for example, a 100 meter coverage radius. Both voice and data modes are desired in small cell deployments. Development of multi-modal multi-modulation capable small cells is complex. Such small cell systems need management of backhaul and core network connectivity as well as advanced features such as capabilities for self-organizing networks.

Further, deployment of small cells can be complex and consume a large amount of technical resources. Network organization grows increasingly complex as an increasing number of cells are deployed. The deployment of small cell eNBs can be extremely cumbersome to an operator's management system from the configuration and maintenance point of view as well as all the signaling and traffic to the mobility management entity. Automation of small call deployment can thus aid in meeting the growing demand for wireless communications.

SUMMARY

In one aspect, the invention provides a base station, comprising: one or more radio modules configured to establish wireless communications with user equipments using one or more cells; a sniffer module configured to detect signal from other base stations; a backhaul interface module configured to send data to a network and receive data from the network; a processor; and a memory coupled to the processor and storing instructions for execution by the processor, the instructions comprising instructions that when executed cause the base station to: scan, using the sniffer module, for received radio signals to detect neighboring base stations; update a neighbor list using information about the detected neighboring base stations; connect to the detected neighboring base stations and receive lists of neighboring base stations from the detected neighboring base stations; add information from the received lists of neighboring base stations to the neighbor list; determine a physical cell identity using the neighbor list; and transmit, using at least one of the one or more radio modules, from the base station using the physical cell identity.

In one aspect, the invention provides a method for use in deploying a small cell base station in a self-organizing network. The method comprises: scanning for received radio signals to detect neighboring base stations; updating a neighbor list using information about the detected neighboring base stations; connecting to the detected neighboring base stations and receiving lists of neighboring base stations from the detected neighboring base stations; adding information from the received lists of neighboring base stations to the neighbor list; determining a physical cell identity using the neighbor list; and establishing wireless communications with user equipments in a cell using the physical cell identity.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The systems and methods disclosed herein can be used with small cells and other base stations. Small cells can be operated in a wireless network to provide wireless network connectivity to a plurality of user devices. The small cell can cooperate with other devices in the wireless network to self-organize to efficiently provide communication services. A network with such operations is commonly referred to as self-organizing network (SON). The systems and methods disclosed herein may be used to operate SONs and to deploy base stations in a wireless communication network. For concise exposition, various embodiments are described using terminology and organization of particular technologies, standards, and services. However, the systems and methods described herein are broadly applicable to other technologies, standards, and services.

Figure 1:
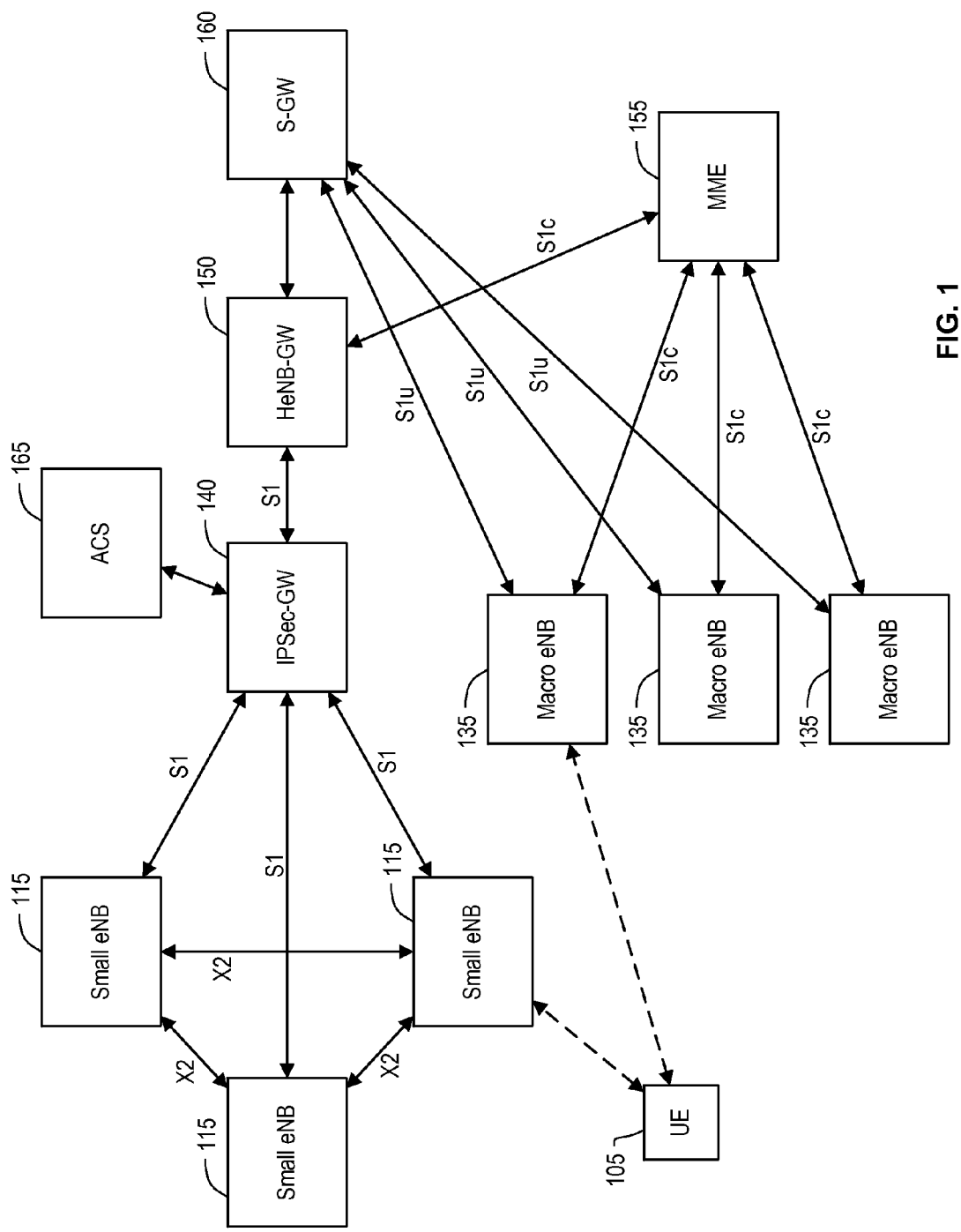
FIG. 1 is a diagram of a small cell deployed in a wireless communications network in accordance with aspects of the invention.

FIG. 1 is a diagram of a small cell deployed in a wireless communications network in accordance with aspects of the invention. The wireless communications network in the illustrated embodiment includes six base stations (evolved Node B, eNodeB, or eNB)—three small cell eNBs 115 and three macro eNBs 135. The small cell eNBs 115 are small base stations and may be deployed to provide coverage for a smaller area than the macro eNBs 135. A small cell eNB may also be termed, for example, a small form-factor cell, femtocell, femto access points (FAPs) picocell, small eNB, or small cell. The small cell eNB may, for example, provide coverage for an office building, hotel, condominium complex, shopping mall, airport, train station, or event venue. Small cells may be used to fill in coverage in indoor environments where signals from outdoor macro base stations do not easily reach. Small cell eNBs may also be used to add network capacity in areas where dense mobile device usage can be present, such as airports, train stations, and sports or concert venues.

The small cell eNBs 115 may be configured to provide coverage for one or more mobile phone carriers or network providers. The small cell eNBs 115 can communicate with a core network via an external security gateway 140 using an S1 interface. The communication between the small cell eNBs 115 and the external security gateway 140 can be a broadband connection provided by an Internet service provider (ISP) network. One of the small cell eNBs 115 may also communicate with the other small cell eNBs 115 over X2 interfaces.

The external security gateway 140 is coupled to an automatic configuration system (ACS) 165. The ACS 140 can operate as a configuration server that manages configurations of the eNBs at an operator centralized location. The external security gateway 140 is also coupled to a home eNB gateway 150. The home eNB gateway 180 may connect multiple small cell eNBs to a serving gateway 160 and a mobility management entity (MME) 155. The macro eNBs 135 also connect to the serving gateway 160 and the MME 155. The small cell eNBs 115 may communicate with the macro eNBs 135 by way of the serving gateway 160 and the MME 155. The serving gateway 160 provides communications to other devices, for example, via a packet gateway.

A user equipment 105 can communication with the small cell eNBs 115 and the macro eNBs 135. The user equipment 105 may handover between the small cell eNBs 115, between the macro eNBs 135, or between one of the small cell eNBs 115 and one of the macro eNBs 135. The user equipment 105 may be a mobile device, such as a mobile phone, wireless modem, or other device that uses voice, data, or other communications services. The user equipment 105 may also be a fixed location device.

The small cell eNBs 115, in an embodiment, provides automated functions for deployment in self-organizing networks. For example, the small cell eNBs 115 may provide network monitoring, neighbor peer discovery, processing of neighbor peer reports, automated transmit-power adaptation, processing of user equipment reports, physical cell identity selection, automatic neighbor relation, handover configuration, private access connections, load balancing, RACH preamble power control, RACH preamble set selection, RACH preamble splitting, PRACH configuration, and mobility robustness.

Figure 2:
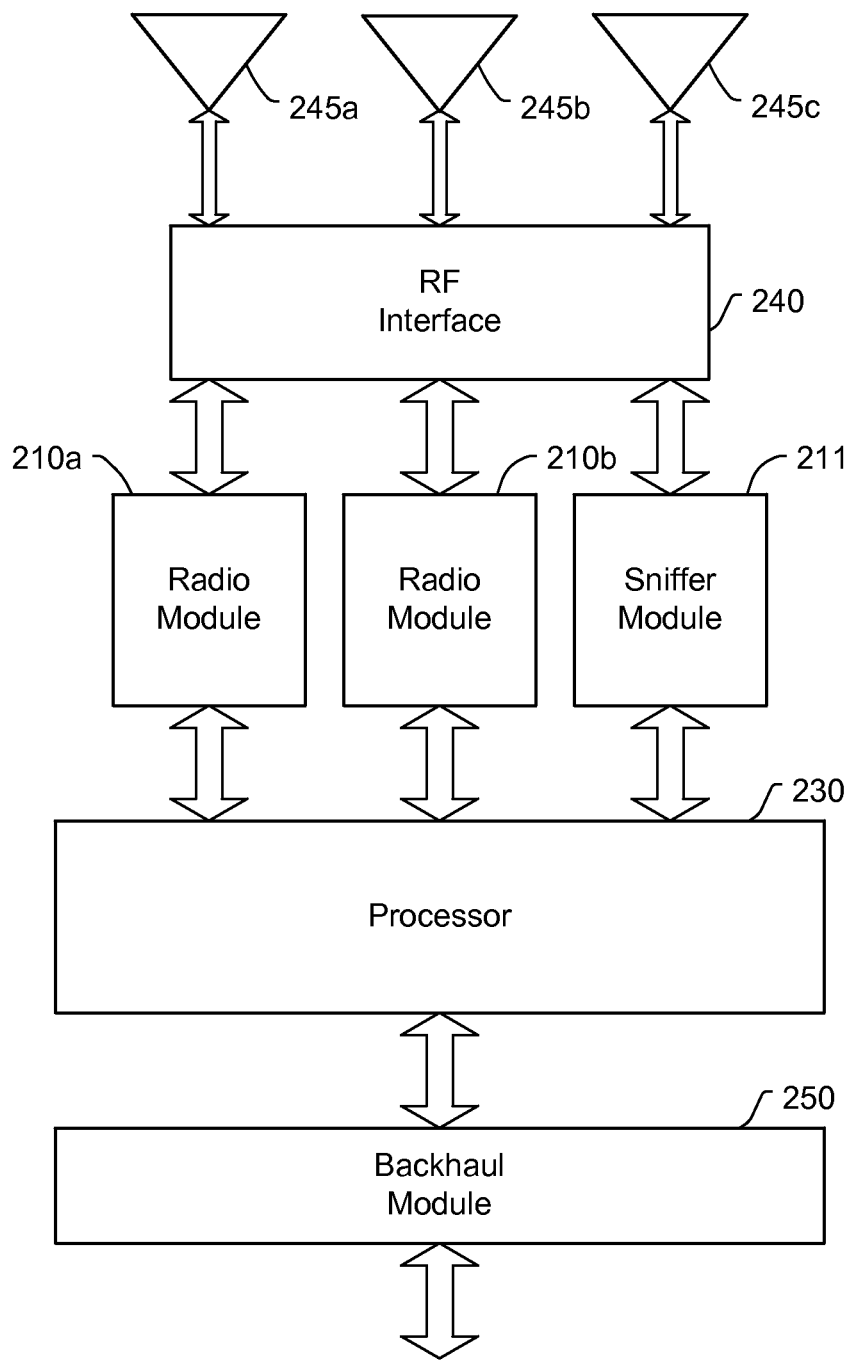
FIG. 2 is a functional block diagram of a small cell eNB in accordance with aspects of the invention.

FIG. 2 is a functional block diagram of a small cell eNB in accordance with aspects of the invention. The small cell eNB may be used to implement the small cell eNB 115 of FIG. 1. The small cell eNB of FIG. 2 includes a radio frequency (RF) interface module 240, a backhaul interface module 250, and a processor module 230. The small cell eNB illustrated in FIG. 2 includes two radio modules 210 and a sniffer module 211. However, in other embodiments, the small cell eNB may include greater or fewer radio modules and the sniffer module may be combined with a radio module. For example, a small cell eNB deployed in an area that is anticipated to have a high concentration of user devices during peak usage may include more radio modules than a small cell eNB deployed in an area that is anticipated to have a low concentration of user devices. Additionally, a small cell eNB may provide communications for multiple cells.

The RF interface module 240 provides an interface for radio signals to and from the small cell eNB. The RF interface module 240 couples the radio modules 210 and the sniffer module to antennas 245. The small cell eNB illustrated in FIG. 2 includes three antennas 245. In other embodiments, the small cell eNB may include greater or fewer antennas. One of the antennas 245 may be dedicated to the sniffer module 211. The RF interface module 240 includes circuitry for transmission and reception of the radio signals such as power amplifiers for driving the antennas, low noise amplifiers (LNAs) for amplifying signals received by the antennas, tuners, upconverters, and downconverters.

The RF interface module 240, in some embodiments, combines and splits the radio signals. For example, the small cell eNB may be configured for multiple-input, multiple-output (MIMO) or diversity operation. Additionally, the RF interface module 240 may operate in multiple frequency bands. The RF interface module 240 may include modules that are dynamically configurable or adjustable. For example, a power amplifier in the RF interface module 240 may be configured for various predistortion techniques and may have an adjustable bias setting.

Each of the radio modules 210 may be configured to support a specific protocol stack. The protocol stack may include, for example, a Radio Resource Control (RRC) layer, a Packet Data Convergence Protocol (PDCP) layer, a Radio Link Control (RLC) layer, a Media Access Control (MAC) layer, and a Physical (PHY) layer. The protocol layers of the radio modules 210 may differ and allocation of functions over the layers may also differ.

The Radio Resource Control (RRC) layer handles the control plane signaling of Layer 3 between the user devices and the Universal Terrestrial Radio Access Network (UTRAN). The UTRAN allows connectivity between the UE and the core network. The UTRAN includes base stations (eNodeBs) and Radio Network Controllers (RNCs). The RRC layer provided functions for connection establishment and release, the broadcast of system information, radio bearer establishment/reconfiguration and release, paging notification and release, and outer loop power control.

The Packet Data Convergence Protocol (PDCP) layer performs IP header compression and decompression, transfer of user data and maintenance of sequence numbers for Radio Bearer.

The Radio Link Control (RLC) layer delivers data to the MAC layer over logical channels. The RLC layer maps these logical channels to transport channels that represent the interface to the physical layer. The RLC layer can provide error correction and can also ensure that data is delivered only one time and in the correct sequence. The RLC layer can also segment data packets delivered by higher layers so that the MAC sublayer receives data of the correct size over the logical channels.

The Media Access Control (MAC) layer coordinates access to the physical medium over which data is transmitted. The MAC layer can include queue in which data for different data streams can be placed until the data is transmitted.

The Physical (PHY) layer provisions transport channels, maps transport channels to the physical interface, provides macro diversity and soft handover. The physical layer can also provide error protection, such as forward error correction and interleaving. The physical layer can also provide for multiplexing and demultiplexing, frequency and time synchronization, power control, and measurements of various characteristics of the physical link, such as frame error rate.

The different radio modules 210, in some embodiments, may be configured to implement different protocol stacks. For example, in the embodiment illustrated in FIG. 2, the first radio module 210a may be configured to implement a UMTS protocol stack and the second radio module 210b may be configured to implement a long term evolution (LTE) protocol stack. The radio modules 210, in some embodiments, can be reconfigured dynamically based on the types of user devices being served by the small cell eNB.

The sniffer module 211 operates to sense radio signals received by the small cell eNB. The small cell eNB may use information about sensed signals, for example, to determine frequencies to transmit on and to detect neighbor cells. The sniffer module 211 can detect the received signal strength, decode the master information block and decode the system information blocks of the sensed signals. The signal strengths and decoded information blocks of the sensed signals may provide operational details of the neighbor cells to other algorithms operating within the small cell eNB.

The radio modules 210 and sniffer module 211 may be provided as software-defined radios (SDRs). An SDR is a programmable radio device that includes a processor for executing signal processing. A variety of different radio protocols (waveforms) can be received and transmitted depending on the software that is executed by the processor of an SDR. An SDR can be rapidly reconfigured to change radio protocols used. In an embodiment, processing circuitry may be shared between radio modules and between radio modules and other modules of the small cell eNB.

The processor module 230 provides processing resources for the small cell eNB. The processor module 230 can process communications being received and transmitted by the small cell eNB. The processor module 230 can also manages resources of the small cell eNB. The processor module 230 includes or is coupled to a memory. The memory stores data for use by the processor module. The memory may also be used to store computer readable instructions for execution by the processor module 230. The computer readable instructions can be used by the small cell eNB for accomplishing the various functions of the small cell eNB. The memory or part thereof may be considered a non-transitory machine readable medium. For concise description, the small cell eNB or embodiments of it are described as having certain functionality. This functionality, in various embodiments, is accomplished by the processor module 230, other modules, or a combination of modules. Furthermore, in addition to executing instructions, the processor module 230 may include specific purpose hardware to accomplish some functions.

The processor module 230 can manage radio resources of the small cell eNB. The processor module 230 provides an interface that allows the small cell eNB to include a plurality of the radio modules 210. The processor module 230 provides functions for a common radio element application manager (CREAM).

The backhaul interface module 250 provides an interface to backhaul communications for the small cell eNB. The backhaul connections may vary, for example, depending on the type of network that the small cell eNB will be connected to. For example, the backhaul interface module 250 may include a Data Over Cable Service Interface Specification (DOCSIS) connection, an Asymmetric Digital Subscriber Line (ADSL) connection, a Very-high-bit-rate Digital Subscriber Line (VDSL) connection, a satellite connection, or an optical fiber connection. In some embodiments, the backhaul interface module 250 includes connections for multiple backhaul interfaces. Data received from the network is supplied to the other modules of the small cell eNB via the backhaul interface module 250. Similarly, data from the modules of the small cell eNB is transmitted to the network via the backhaul interface module 250. The backhaul interface module 250 may also provide power distribution and control, environmental monitoring, and local and remote system management support for the small cell eNB.

The small cell eNB can use the sniffer module 211 as a radio in band sniffer to detect existing macro base station carrier frequencies or other small cell carrier frequencies in wireless radio bands. The small cell eNB can also information from the sniffer module 211 in SON functions. The SON functions can include setting up RF power parameters for the small cell coverage, continuously monitoring RF spectrum and optimizing coverage for users present in cells managed by the small cell eNB and in adjacent cells, optimizing the RF parameters to reduce interference to the macro network and to the UE tied to the macro network, using sniffed information of the frequency usage to allow offload to other frequency bands, examining usage of one carrier's radio resources and reallocating capacity from a full carrier to other unused carriers within the same band, using network monitoring mode to allow for small cell to small cell handovers and small cell to macro handovers and vice versa, using network monitoring to allow the use of several mobile network operator in a neutral host application, and using network monitoring parameters to enable software defined radio baseband elements to increase capacity elements or throughput QoS. The small cell eNB can also use the sniffer module 211 for peer management of frequency usage and allocation. The small cell eNB can include dynamic sniffing to dynamically adjust output power to not interfere with existing macro frequencies.

Example embodiments of a small cell eNB are further described in U.S. application Ser. No. 13/444,704, filed Apr. 11, 2012 and published as U.S. 2010/0264470, and in U.S. application Ser. No. 13/926,700, filed Jun. 25, 2013, which are hereby incorporated by reference. For example, the picocell described with reference to FIG. 2 in U.S. application Ser. No. 13/444,704 may be used to implement the small cell eNB of the present application. Similarly, the small cell described with reference to FIG. 2 in U.S. application Ser. No. 13/926,700 may be used to implement the small cell eNB of the present application. Furthermore, the CREAM functions and modules described in U.S. application Ser. No. 13/444,704 and U.S. application Ser. No. 13/926,700 may be included in the small cell eNB of the present application and be used to provide various process of the small cell eNB.

Figure 3:
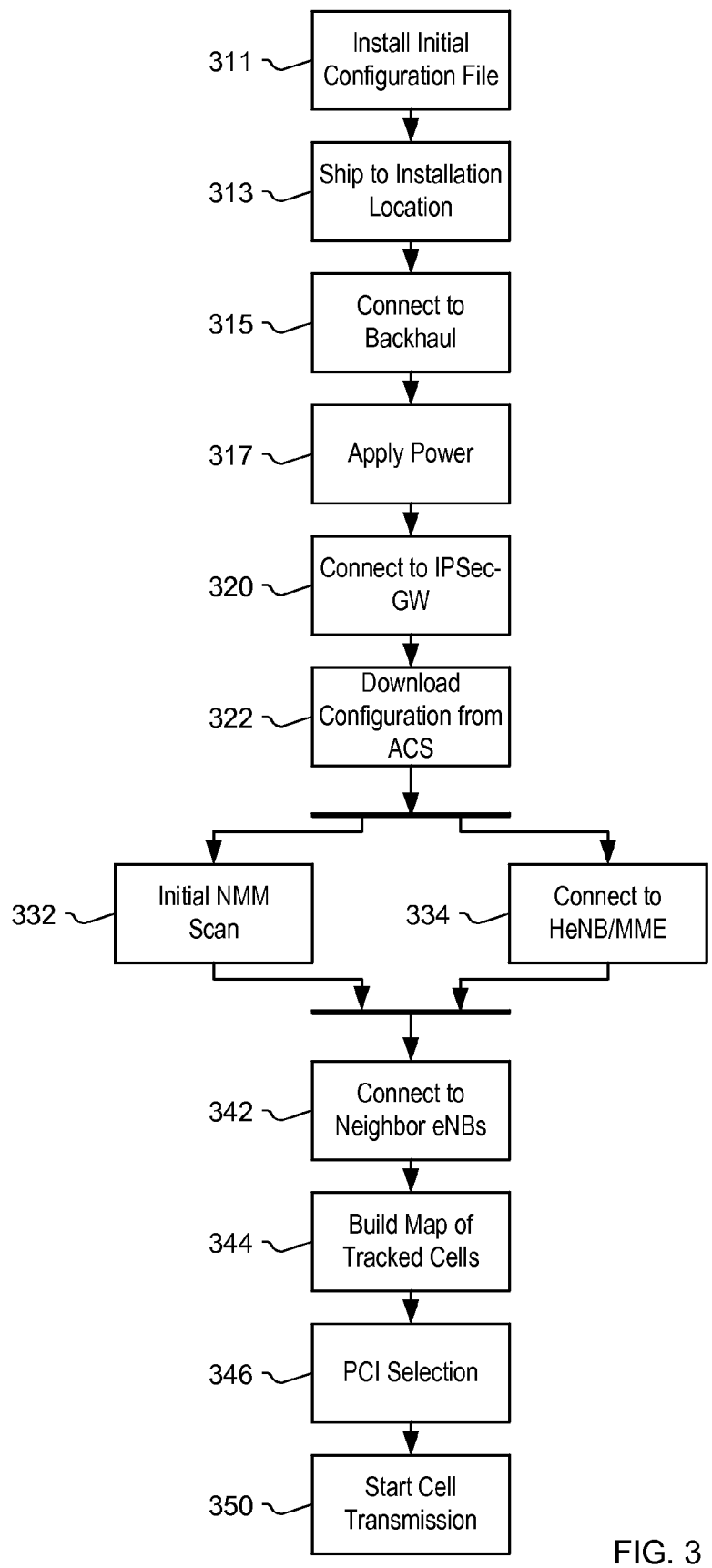
FIG. 3 is a flowchart illustrating a process for deployment of a small cell in a self-organizing network in accordance with aspects of the invention.

FIG. 3 is a flowchart illustrating a process for deployment of a small cell eNB in a self-organizing network in accordance with aspects of the invention. The process may be performed, for example, to deploy the small cell eNBs of FIG. 2 in the wireless communication network of FIG. 1. To provide a specific example, the process will be described with reference to wireless communication network of FIG. 1 and the small cell eNB of FIG. 2.

In step 311, an initial configuration file is installed in the small cell eNB. The initial configuration file may be installed, for example, by a technician of the supplier of the eNB. The initial configuration file can be installed in a non-volatile memory of the small cell eNB. The processor 230 of the small cell eNB can read values from the initial configuration file to begin operations of the small cell eNB. The initial configuration file can, for example, contain information on how to connect to a server or gateway device.

In step 313, the small cell eNB is shipped to a location where it will be installed. In step 315, the small cell eNB is connected to a backhaul connection at the installation location. In step 317, power is applied to the small cell eNB. The small cell eNB can then begin its configuration process including reading the initial configuration file.

In step 320, the small cell eNB connects to the external security gateway 140. In step 322, the small cell eNB downloads configuration information from the ACS 165. The small cell eNB communicates with the ACS 165 via the external security gateway 140.

In step 332, a network monitor mode module scans received radio signals to detect neighboring eNBs. They sniffer module 211 can be used to detect neighboring eNBs. The neighboring eNB detection can be used to create an initial neighbor list. In step 334, the small cell eNB connects to the home eNB gateway 150 and via the home eNB gateway to the MME 155. Steps 332 and 334 may be performed concurrently.

In step 342, a connection is made to the neighbor eNBs detected in step 332. The connection can use the X2 interface. The small cell eNB can request a list of neighbors from the neighbor eNBs that it connects to. The neighbor eNBs of the neighbor eNBs can be added to the neighbor list.

In step 344, the small cell eNB builds a map of tracked cells using the neighbor and neighbor of neighbor information. In step 346, the small cell eNB uses the map of track cells to select a physical cell identity (PCI). In step 350, the small cell eNB can then set up one or more cells and start transmission using the PCI selection.

Figure 4:
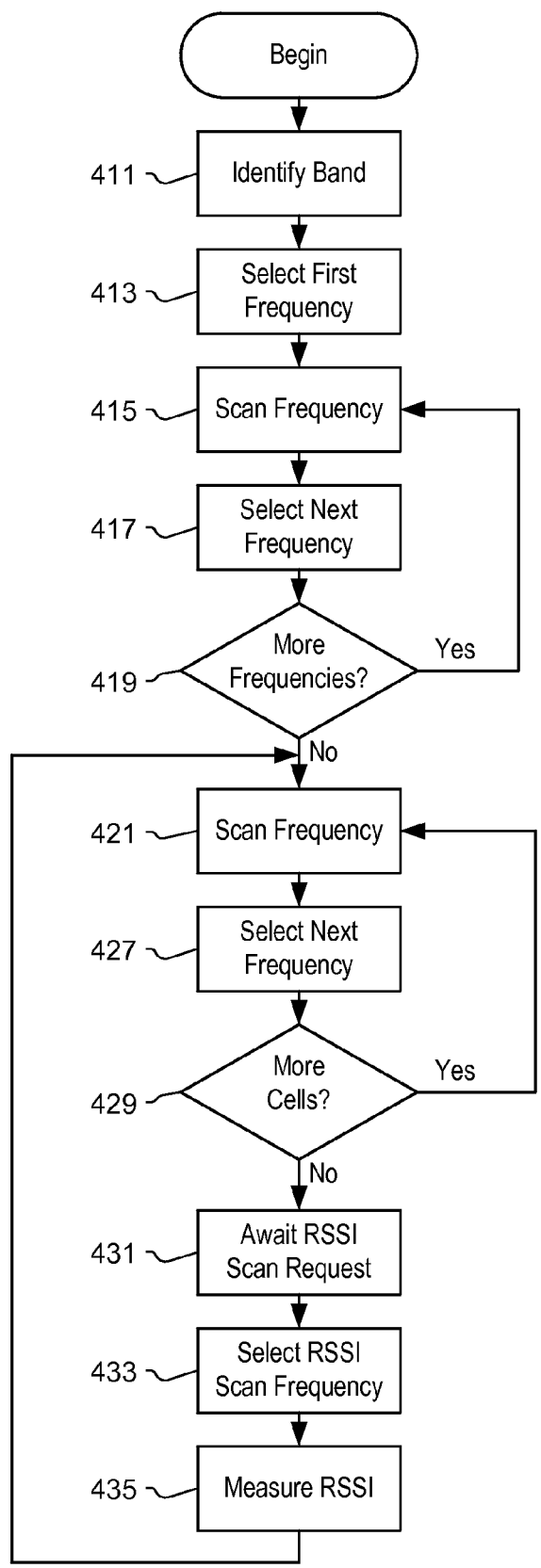
FIG. 4 is a flowchart illustrating operation of a network monitor mode module in accordance with aspects of the invention.

FIG. 4 is a flowchart illustrating operation of a network monitor mode module in accordance with aspects of the invention. The network monitor mode module can operate in three modes of operation—an initialization mode, a continuous mode, and a received signal strength indicator (RSSI) mode.

In the initialization mode, the network monitor mode module performs a full scan of all frequencies to build a map of the neighbor cells. The initialization mode, for example, may be used in step 332 of the process of FIG. 4. In step 411, the network monitor mode module identifies a frequency band to scan. In step 413, a first frequency is selected for signal detection. In step 415, the selected frequency is analyzed to detect any received signals. For example, the sniffer module 211 may determine the signal strength and other characteristics of signals received by the small cell eNB. Since the initialization mode operations occur before the small cell eNB has active cells, the radio modules 210 can also be used for signal detection. In step 417, a next frequency is selected to be scanned. In step 419, the process determines if there are more frequencies to scan. If there are more frequencies to scan, the process returns to step 415; otherwise, the process continues to the continuous mode.

The detected signal information is used to build the map of neighbor cells. The map, among other things, provides the initial input for creation of X2 connections to other eNBs. The information about the detected neighbor cells can also be used as starting information for automatic neighbor relations (ANR) and PCI selection.

In the continuous mode, a dedicated receiver, for example, the sniffer module 210, is used for signal detection. The continuous mode can provide signal detection without interrupting user data traffic to and from the small cell eNB. The use of a dedicated receiver also allows quick detection of intra-frequency network changes. Information about detected network changes can be supplied to self-configuration functions to provide a quick response to dynamic situations. The continuous mode also detects inter-frequency network changes, for example, on a periodic schedule. Information about detected inter-frequency network changes is also supplied for self-configuration and self-optimization functions.

In step 421, a selected frequency is scanned. In step 427, a next frequency to be analyzed is selected. In step 429, the process determines if there are more frequencies to scan. If there are more frequencies to scan, the process returns to step 421; otherwise, the process continues to the RSSI mode. The process may also return to step 421, for example, on a period schedule, when there is not a pending RSSI scan request.

In the RSSI mode, when requested by an X2 peer, the network monitor mode module scans a requested frequency to measure RSSI and reports the results of the measurement.

In step 431, the process waits for an RSSI scan request. The RSSI scan request may be received from a neighbor eNB over the X2 interface. In step, 433, the small cell eNB selects a frequency or frequencies to scan. The selected frequencies may be signaled in the RSSI scan request. In step 435, the RSSI is measured for the selected frequencies. Other measurements may additionally or alternatively be performed. The measurement results are reported to the requesting neighbor eNB.

Figure 5:
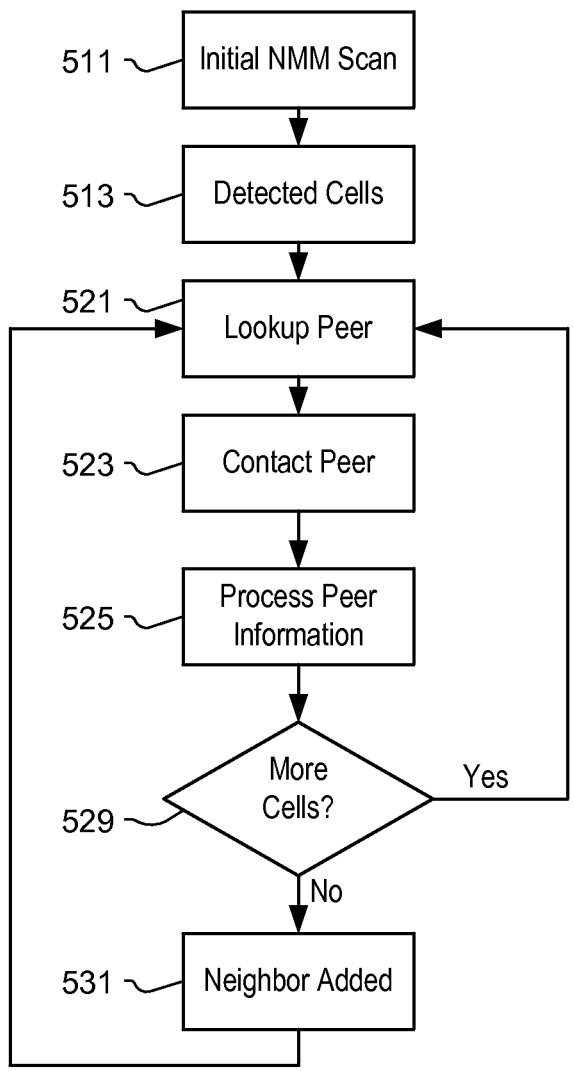
FIG. 5 is a flowchart illustrating a neighbor peer discovery process in accordance with aspects of the invention.

FIG. 5 is a flowchart illustrating a neighbor peer discovery process in accordance with aspects of the invention. The process may be used, for example, in the initialization mode and in the continuous mode operations of the network monitor mode module described with reference to FIG. 4. The neighbor peer discovery process can detect new eNBs (small cell eNBs and macro eNBs).

From the initial scan 511 of the network monitor mode module, for the detected cells by 13, the neighbor peer discovery process performs following sequence of steps. In step 521, a lookup is performed for the ENB peer. If the small cell eNB does not have information about the eNB peer, the small cell eNB requests information from the MME 155. In step 523, using the information about the eNB peer, the small cell eNB contacts the eNB peer to set up an X2 interface connection. In step 525, the small cell eNB requests it receives information from the peer ENB. The received information is processed to add the peer ENB to the neighbor list.

In step 529, the process determines if there are more peer eNBs to process. If there are more peer eNBs to process, the process returns to step 521; otherwise, the process continues to the step 531. In step 531, addition of a new neighbor peer can be detected. When a new peer ENB is detected, the process returns to step 521.

Figure 6:
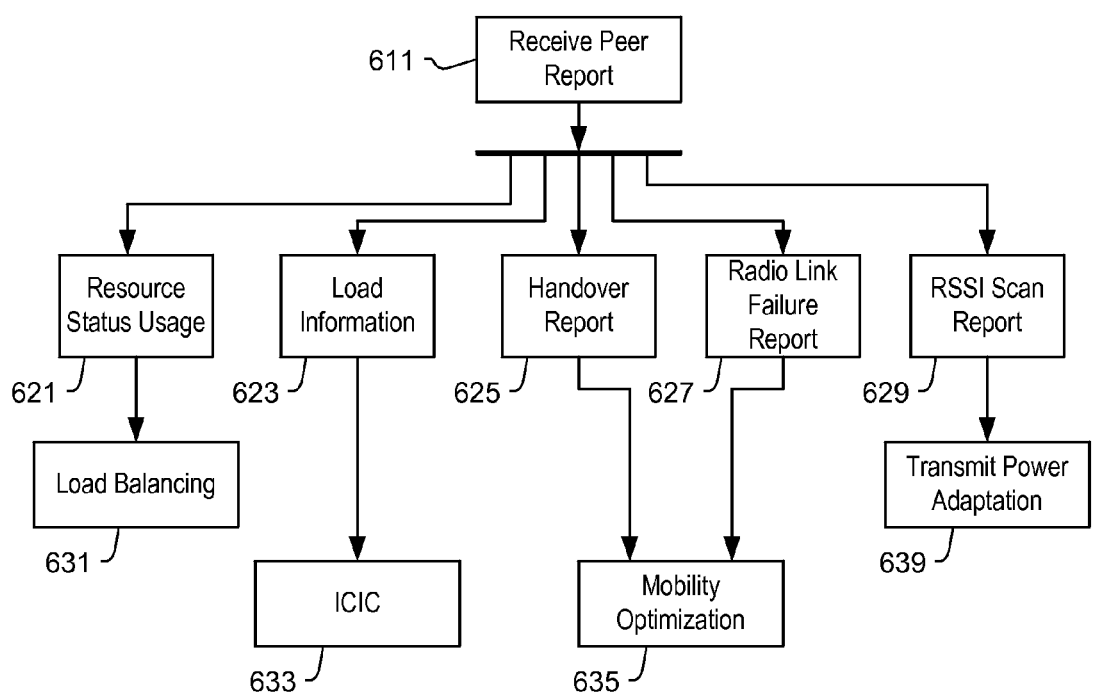
FIG. 6 is a flowchart illustrating reception and processing of neighbor peer reports in accordance with aspects of the invention.

FIG. 6 is a flowchart illustrating reception and processing of neighbor peer reports in accordance with aspects of the invention. The reception and processing of neighbor peer reports may be performed, for example, by the small eNB of FIG. 2. The small cell eNB can continuously monitor for status reports from its peers over the respective X2 interfaces.

In step 611, the small cell eNB receives a peer report from one of its neighboring cells. The peer reports can include various types of information. The peer report may include resource status usage 621. When the small cell eNB receives a repeater report that includes resource status usage 621, information in the received report may be used for load balancing 631.

The peer report may include load information 623. When the small cell eNB receives a peer report that includes load information 623, the information may be used as input to an inter-cell interference coordination function 633.

The peer report may include a handover report 625. The peer report also may include radio link failure information 627. When the small cell eNB receives a peer report that includes a handover report 625 or radio link failure information 627, the information may be used as input to a mobility optimization function 635.

The peer report may include an RSSI scan report 629. When the small cell eNB receives a peer report that includes an RSSI scan report 629, the received information may be used as input to a transmit power adapter nation function 639.

Figure 7:
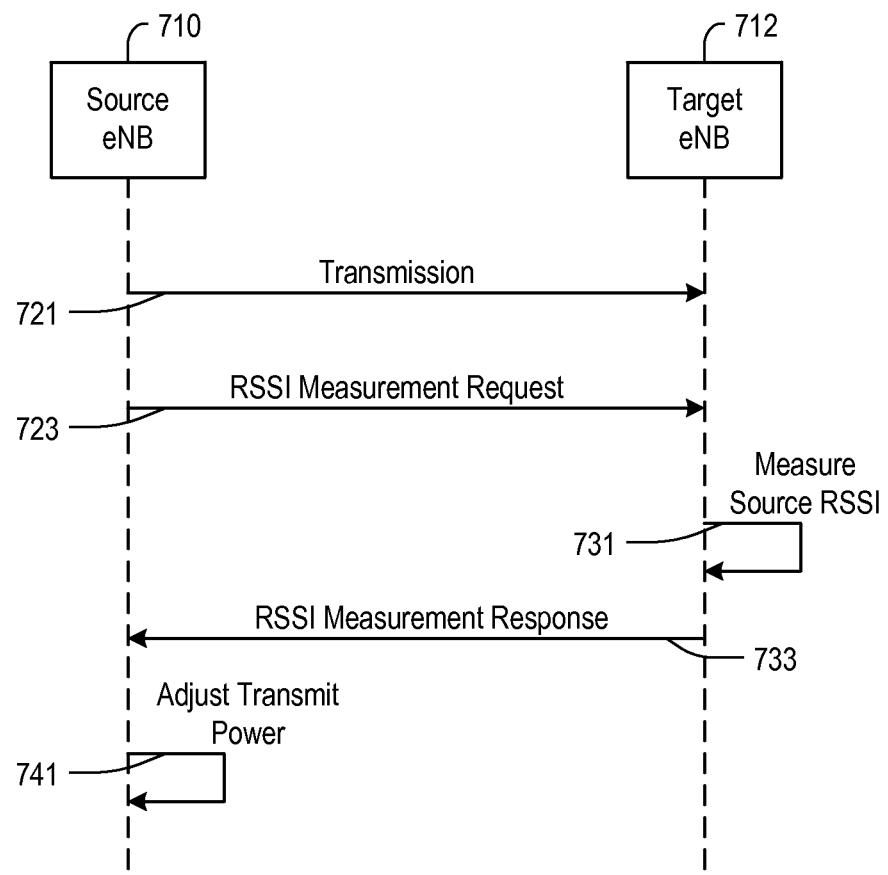
FIG. 7 is a flow diagram illustrating an automated transmit-power adaptation process in accordance with aspects of the invention.

FIG. 7 is a flow diagram illustrating an automated transmit-power adaptation process in accordance with aspects of the invention. The automated transmit-power adaptation may be performed by a pair of small eNBs, for example, a pair of the small cell eNB of FIG. 2. The automated transmit power adaptation process may also be performed by macro eNBs and by more than two eNBs. The flow diagram illustrates a source small cell eNB 710 communicating with a target small cell eNB 712.

The source small cell eNB 710 transmits it a transmission 721 to the target small cell eNB 712. The source small cell eNB 710 also transmits an RSSI measurement request to the target small cell eNB 712. When the target small cell eNB receives the RSSI measurement request, the target small cell eNB 712 performs a measurement 731 of the RSSI of the transmission 721 received from the source small cell eNB 710. The target small cell eNB 712 transmits an RSSI measurement response 733, to the source small cell eNB 710. The RSSI measurement response 733 includes the results of the measurement 731.

When the source small cell eNB 710 receives the RSSI measurement response 733, the source small cell eNB 710 can adjust its transmit power 741. The source small cell eNB 710 may also use RSI measurement reports from other eNBs to adjust its transmit power. The automated transmit-power adaptation process provides a closed loop feedback for tuning the transmit power of the small cell eNB. In an embodiment, a cluster of eNBs perform the automated transmit-power adaptation process. The automated transmit-power adaptation process can help balance the coverage area of cells in the cluster.

Figure 8:
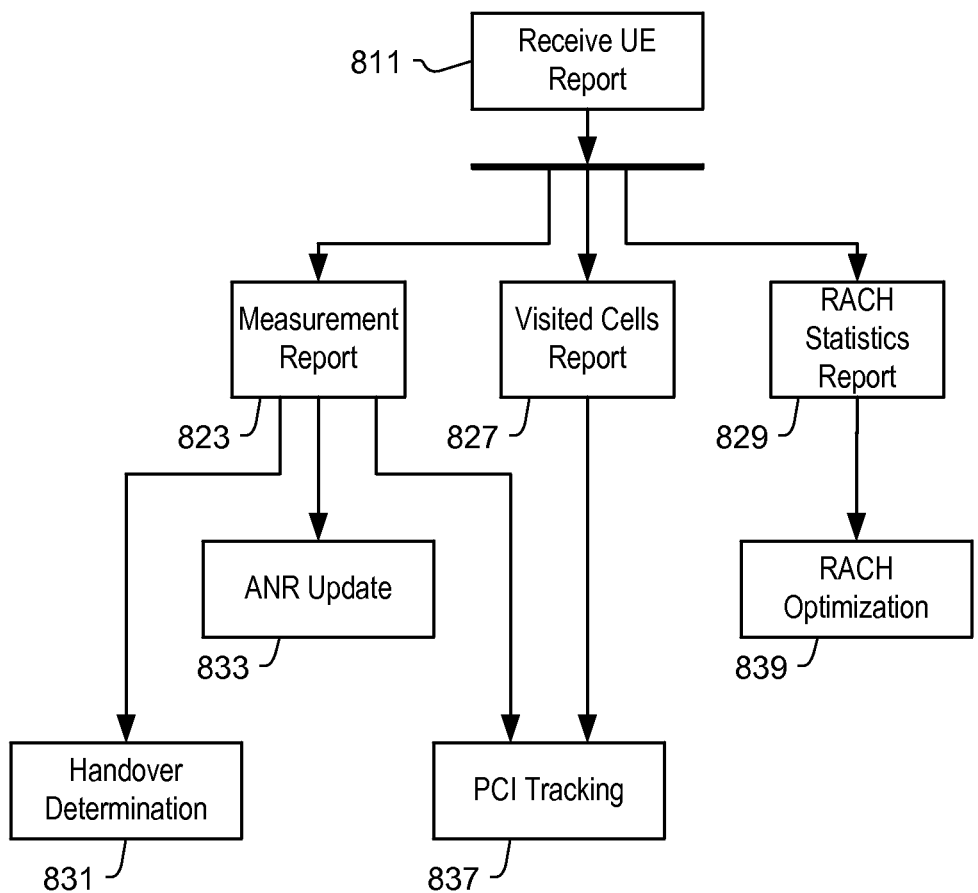
FIG. 8 is a flowchart illustrating reception and processing of user equipment reports in accordance with aspects of the invention.

FIG. 8 is a flowchart illustrating reception and processing of user equipment reports in accordance with aspects of the invention. The reception and processing may be performed, for example, by the small cell eNB of FIG. 2. The small cell eNB can continuously monitor for various user equipment reports. Information in the user equipment reports, can be used, for example, depending upon the type of information, to configure and optimize operation of the small cell eNB.

In step 811, the small cell eNB receives a user equipment report. The user equipment report can include various types of information. The user equipment report may include a measurement report 823. The information in the measurement report 823, can be used for a handover determination function 831, can be used for an ANR update function 833, and can be used for a PCI tracking function 837.

The user equipment report may also include a visited cells report 827. The visited cells report 827 can include information about eNBs that the user equipment has communicated with. Information in the visited cells report 827 can also be used for the PCI tracking function 837.

The user equipment report may also include an RACH statistics report 829. The RACH statistics report 829 can be used in an RACH optimization function 839.

Figure 9:
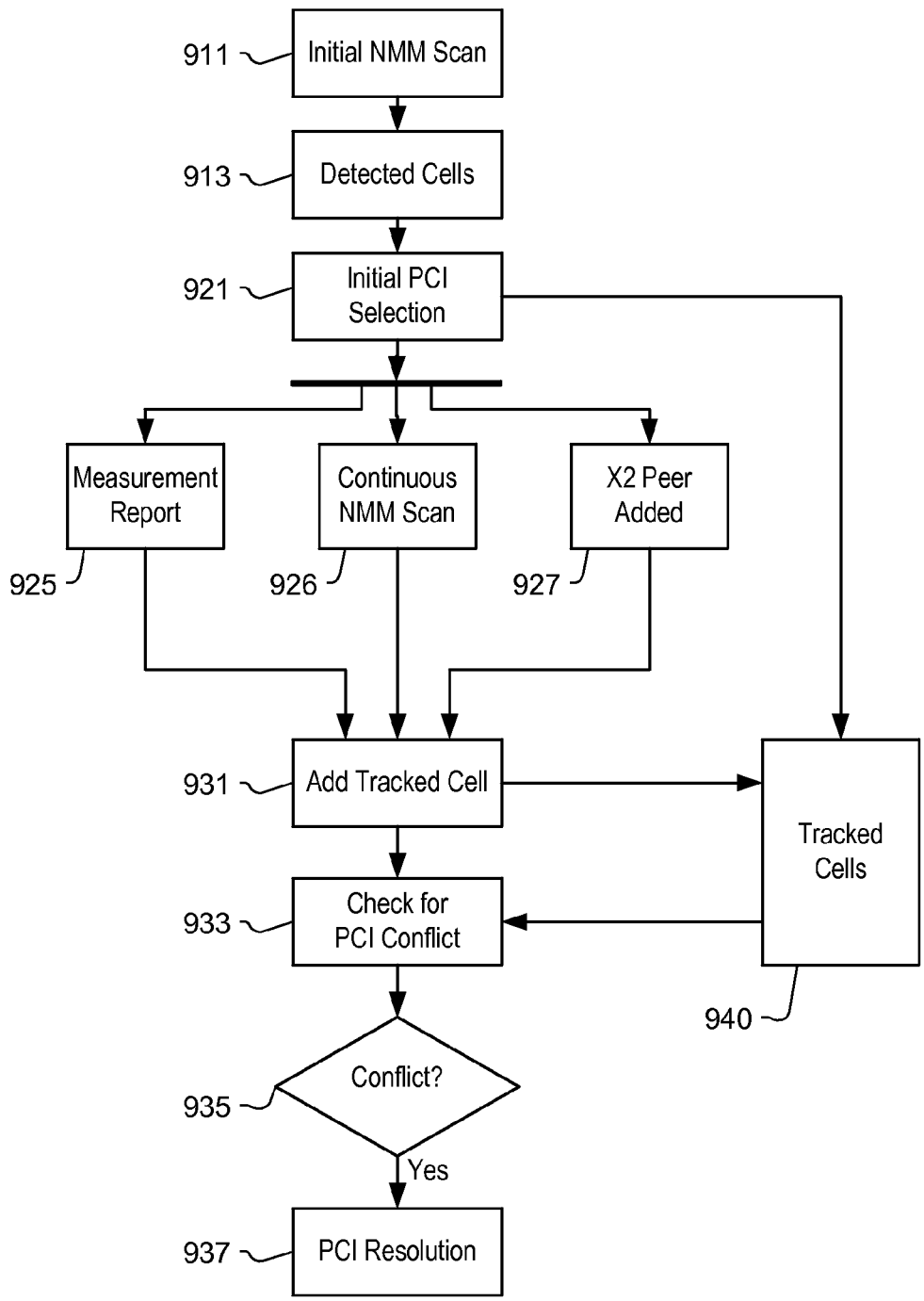
FIG. 9 is a flowchart illustrating a physical cell identity selection process in accordance with aspects of the invention.

FIG. 9 is a flowchart illustrating a physical cell identity selection process in accordance with aspects of the invention. The physical cell identity selection process may be performed, for example, by the small cell eNB of FIG. 2. After the initial network monitor mode scan 911 (e.g., the initialization mode of the network monitor mode module operation illustrated in FIG. 4) the small cell eNB has an initial neighbor list of detected cells 913. The small cell eNB selects an initial PCI 921. The initial PCI may be set, for example, to a value that is not used by any of the detected neighboring cells in the frequency allocation used by the small cell eNB. The PCI can also be selected to reduce co-interference of reference signals between adjacent neighbors.

During operation of the small cell eNB, a PCI conflict may occur. The small cell eNB can check for conflicts after receiving a measurement report 925, after results from the network monitor mode's continuous scan 926, and after an X2 peer is added 927. After these events, in step 931, the small cell eNB adds a new cell to its list (or table or database) of tracked cells 940. The list of tracked cells 940 may be kept by frequency allocations. Step 931 may also be performed after other events where there may be a new tracked cell.

In step 933, the small cell eNB checks for conflicts between the PCI of the small cell eNB and the PCIs used by the cells in the tracked cells 940. In step 935, if a conflict is detected, the process continues to step 937; otherwise, the process returns and awaits another event that can lead to a PCI conflict.

In step 937, the small cell eNB resolves the PCI conflict be selecting a new PCI. Selection of the new PCI may be the same or similar to the initial PCI select of step 921.

A user equipment connected to the small cell eNB may detect a previously unknown cell. The user equipment can then report the PCI of the unknown cell to the small cell eNB. The small cell eNB can then send a measurement configuration (e.g., using the small cell eNB's radio resource manager) to the user equipment to cause the user equipment to report the cell global identity (CGI) of the unknown cell to the small cell eNB. The small cell eNB can add the information from the user equipment to the list of tracked cells 940.

Figure 10:
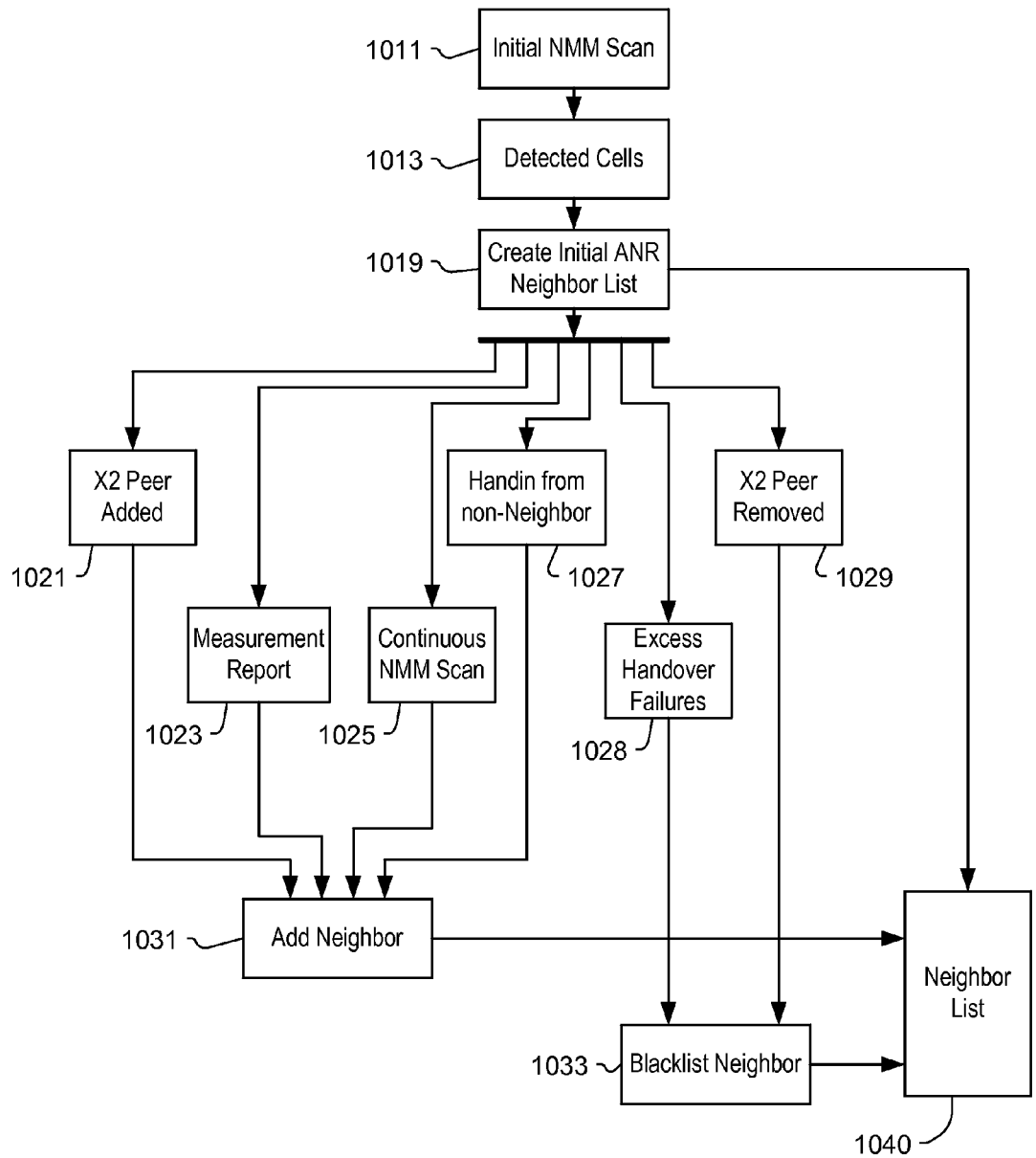
FIG. 10 is a flowchart illustrating an automatic neighbor relations process in accordance with aspects of the invention.

FIG. 10 is a flowchart illustrating an automatic neighbor relations (ANR) process in accordance with aspects of the invention. The automatic neighbor relations process may be performed, for example, by the small cell eNB of FIG. 2. After the initial network monitor mode scan 1011 (e.g., the initialization mode of the network monitor mode module operation illustrated in FIG. 4) the small cell eNB has information about detected cells 913. The small cell eNB creates 1019 an initial ANR neighbor list 1040 from the information about the detected cells.

During operation of the small cell eNB, events may occur that cause the small cell eNB to update the ANR neighbor list 1040. The number of entries in the ANR neighbor list 1040 may be limited, for example, to 32 neighbors. List may be recycled on a least-recently used (LRU) basis.

One event is an X2 peer addition 1021. Another event is receipt of a measurement report 1023 with information about an eNB that is not currently a neighbor as a handover candidate. When a user equipment detects a signal from an eNB with a certain signal strength (e.g., with RSRP exceeding threshold value). The user equipment can then report the PCI of the detected cell to the small cell eNB. The small cell eNB can then send a measurement configuration to the user equipment to cause the user equipment to report the CGI of the detected cell to the small cell eNB. If the detected cell is new to the small cell eNB, the detected cell can be added to the neighbor list. Another event is that the continuous mode operation of the network monitor mode module may detect a new peer 1025. Another event is that a user equipment may be handed in to the small cell eNB from a new peer 1027. Hand in of the user equipment may begin with the eNB currently serving the user equipment ("source" eNB) determining that handover to the small cell eNB ("target" eNB, which is performing the ANR process) is needed. The user equipment detects the target eNB and sends a measurement report to the source eNB. The source eNB negotiates resources for the user equipment on the target eNB, either directly via X2 communication or indirectly via S1. If the resources are allocated successfully, the source eNB directs the user equipment to acquire the target eNB. If the user equipment successfully acquires and connects to the target eNB, the source eNB can be added as a neighbor. The foregoing events can cause the small cell eNB to add a neighbor 1031 to the neighbor list 1040. Other events may also cause removal of a neighbor.

Another type of event is that the small cell eNB may determine that handovers to one of the neighbors experience an excess number of failures 1028. For use in, inter alia, step 1028, the small cell eNB tracks handover success rates for each neighbor. Excessive failures may be determined when the success rate is less than a configurable threshold. Another event is that an X2 peer has been removed 1029. The foregoing events can cause the small cell eNB to blacklist a neighbor 1033 in the neighbor list 1040. Other events may also cause blacklisting of a neighbor. The small cell eNB may not handover user equipments to a blacklisted neighbor.

Handovers in the wireless communications network can occur in different ways. A user equipment can handover from one small cell eNB to another small cell eNB where the two small cell eNBs have an X2 connection. A user equipment can also handover from a small cell eNB to a macro eNB.

Figure 11:
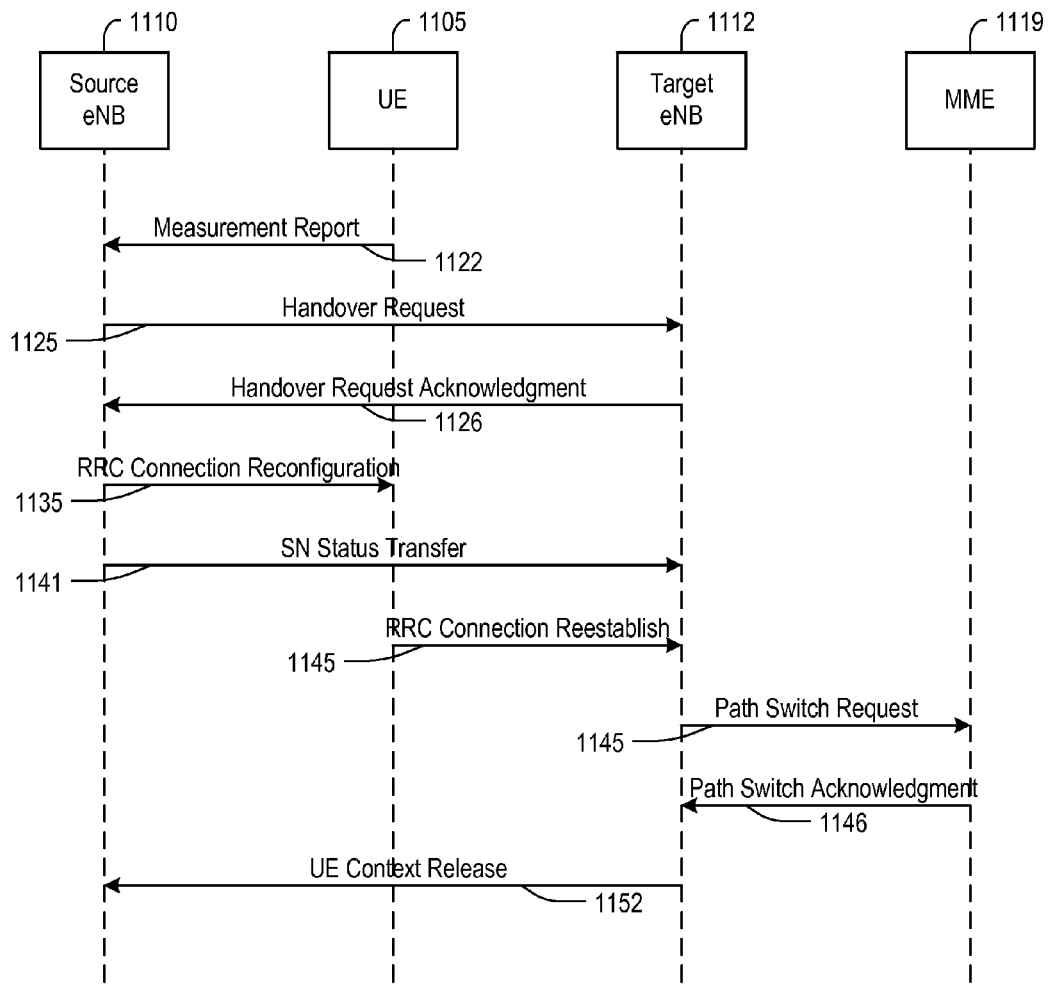
FIG. 11 is a flow diagram illustrating a handover process in accordance with aspects of the invention.

FIG. 11 is a flow diagram illustrating a handover process in accordance with aspects of the invention. The illustrated handover is for a user equipment 1105 handing over from a source small cell eNB 1110 to a target small cell eNB 1112. The process may be performed, for example, using the small cell eNBs of FIG. 2. To provide a specific example, the process will be described with reference to wireless communication network of FIG. 1. Thus, the user equipment 105 may be handover between two of the small cell eNBs 115, which communicate over an X2 interface. Although described for small cell eNBs, the handover process may also be performed by macro eNBs.

The handover process can begin with the source small cell eNB 1110 receives a measurement report 1122 from the user equipment 1105 that indicates the user equipment 1105 should be handed over. The user equipment 1105 may, for example, detect a signal from the target small cell eNB 1112 with characteristics (e.g., based on RSRP) that causes the user equipment 1105 to send the measurement report 1122.

When the source small cell eNB 1110 analyzes (e.g., by its radio resource manager) the measurement report and determines that the user equipment 1105 should be handed over to the target small cell eNB 1112, the source small cell eNB 1110 finds a X2 interface to the target small cell eNB 1112. The source small cell eNB 1110 sends a handover request 1125 to the target small cell eNB 111 over the X2 interface. The target small cell eNB 1112 sends a handover request acknowledgment 1126 to the source small cell eNB 1110. The target small cell eNB 1112 may evaluate its current loading before accepting the handover request.

The source small cell eNB 1110 can then send an RRC connection reconfiguration message 1135 to the user equipment. The source small cell eNB 1110 also sends a sequence number status transfer 1141 to the target small cell eNB 1112.

The target small cell eNB 1112 can send an RRC connection re-establishment command to the user equipment 1105. The target small cell eNB 1112 then sends a path switch request 1145 to the MME 1119 informing the MME 1119 of the handover. The MME 1119 confirms the path change by sending a path switch acknowledgment 1146 to the target small cell eNB 1112.

The target small cell eNB 1112 can send a send UE context release 1152 to the source small cell eNB 1110 to inform the source small cell eNB 1110 of successful handover. The source small cell eNB 1110 may then release resources allocated to the user equipment 1105.

Figure 12:
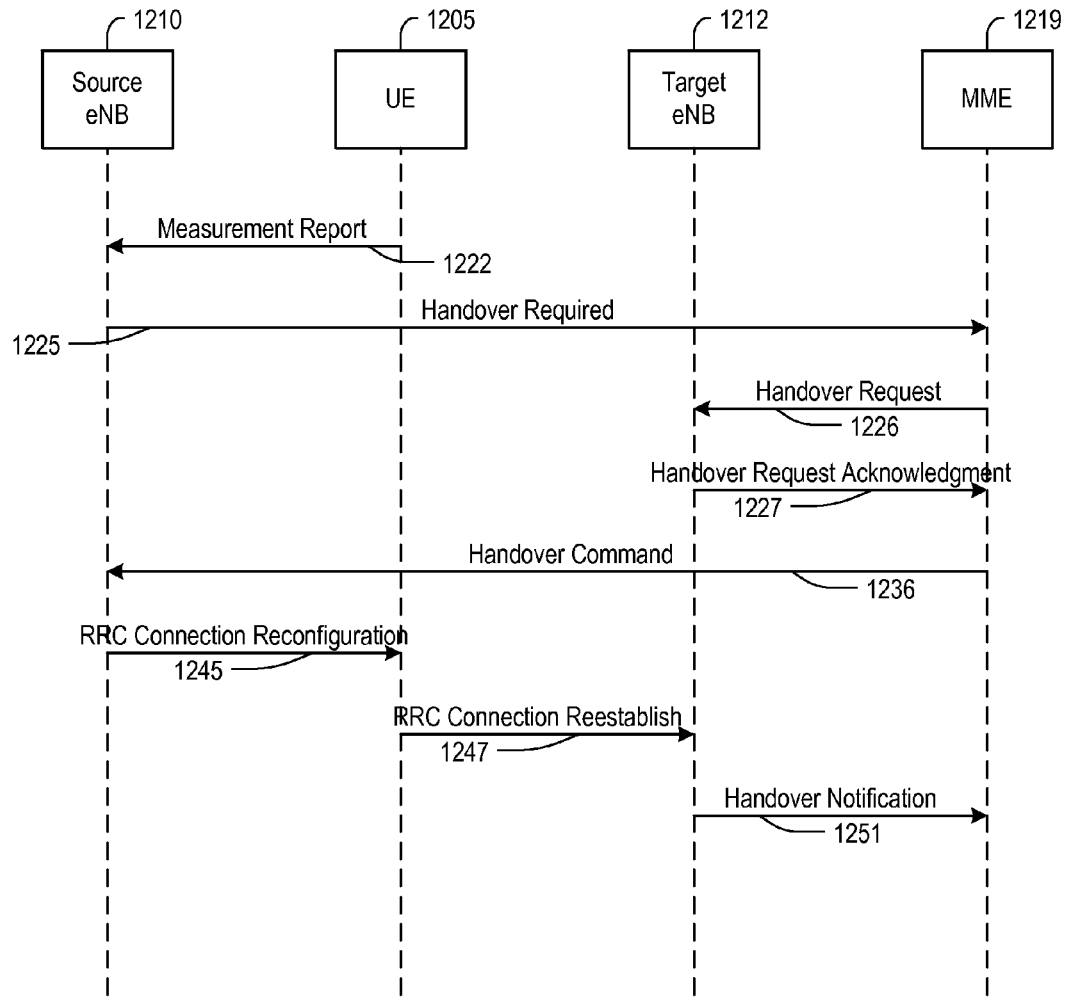
FIG. 12 is a flow diagram illustrating another handover process in accordance with aspects of the invention.

FIG. 12 is a flow diagram illustrating another handover process in accordance with aspects of the invention. The illustrated handover is for a user equipment 1205 handing over from a source small cell eNB 1210 to a target macro eNB 1212. The process may be performed, for example, using the small cell eNBs of FIG. 2. To provide a specific example, the process will be described with reference to wireless communication network of FIG. 1. Thus, the user equipment 105 may be handover between one of the small cell eNBs 115 and one of the macro eNBs 135. Although described for one small cell eNB and one macro eNB, the handover process may also be performed by between two small cell eNBs or two macro eNBs.

The handover process can begin with the source small cell eNB 1210 receives a measurement report 1222 from the user equipment 1205 that indicates the user equipment 1205 should be handed over. The user equipment 1205 may, for example, detect a signal from the target macro eNB 1212 with characteristics (e.g., based on RSRP) that causes the user equipment 1205 to send the measurement report 1222.

When the source small cell eNB 1210 analyzes (e.g., by its radio resource manager) the measurement report and determines that the user equipment 1205 should be handed over to the target macro eNB 1212, the source small cell eNB 1210 fails to find a X2 interface to the target macro eNB 1212. The source small cell eNB 1210 then sends a handover required message 1225 to the MME 1219 over the S1 interface.

The MME 1219 may then send a handover request 1226 to the target macro eNB 1212. The target macro eNB 1212 sends a handover request acknowledgment 1226 to the MME 1219. The target macro eNB 1212 may evaluate its current loading before accepting the handover request. The MME 1219 sends a handover command 1236 to the source small cell eNB 1210. The source small cell eNB 1210 can then send an RRC connection reconfiguration message 1245 to the user equipment.

The target macro eNB 1212 can then send an RRC connection re-establishment command to the user equipment 1205. The target macro eNB 1212 then sends a handover notify message 1251 to the MME 1219 informing the MME 1219 of successful handover.

Figure 13:
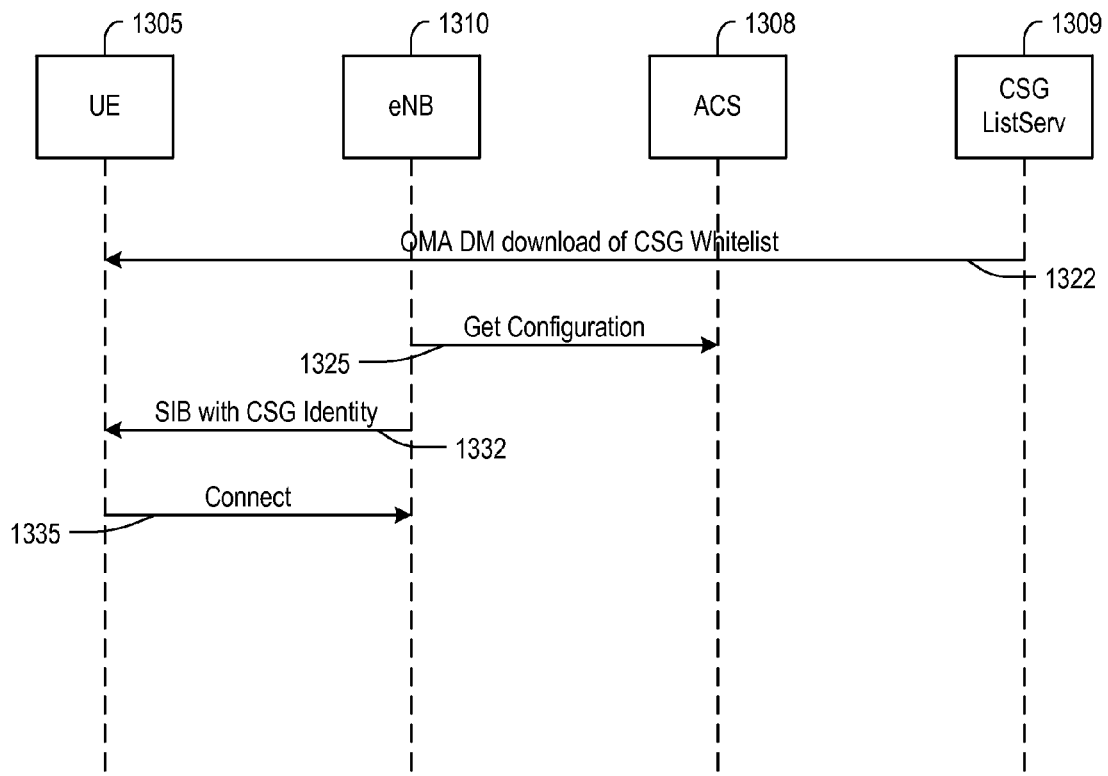
FIG. 13 is a flow diagram illustrating private access connections in accordance with aspects of the invention.

FIG. 13 is a flow diagram illustrating private access connections in accordance with aspects of the invention. The illustrated connections may be performed, for example, by the small cell eNBs of FIG. 2 operating in the wireless communication network of FIG. 1. A group of small cell eNBs may be limited to use only by certain users. The allowed users may be identified by a closed subscriber group (CSG). A group of eNBs may have assigned CSG identities that are also assigned to the user equipments. The eNBs can broadcast their CSG identities, and the user equipments will only attempt to access or handover to eNBs that broadcast white listed CSG identities.

In the connections for private access illustrated in FIG. 13, the user equipment 1305 receives a download of available private eNBs in a CSG whitelist 1322. The user equipment may receive the CSG whitelist 1322 using OMA device management. The eNB 1310 also gets configuration information 1325 from the ACS 1308. The configuration information includes a CSG identity for the eNB.

The eNB 1310 then transmit a system information block 1332 that includes the CSG identity of the eNB. When the user equipment 1305 receives the system information block 1332 and determines that the CSG identity matches an entry in the user equipment's CSG whitelist, the user equipment 1305 can send a connect request 1335 to the eNB 1310.

Figure 14:
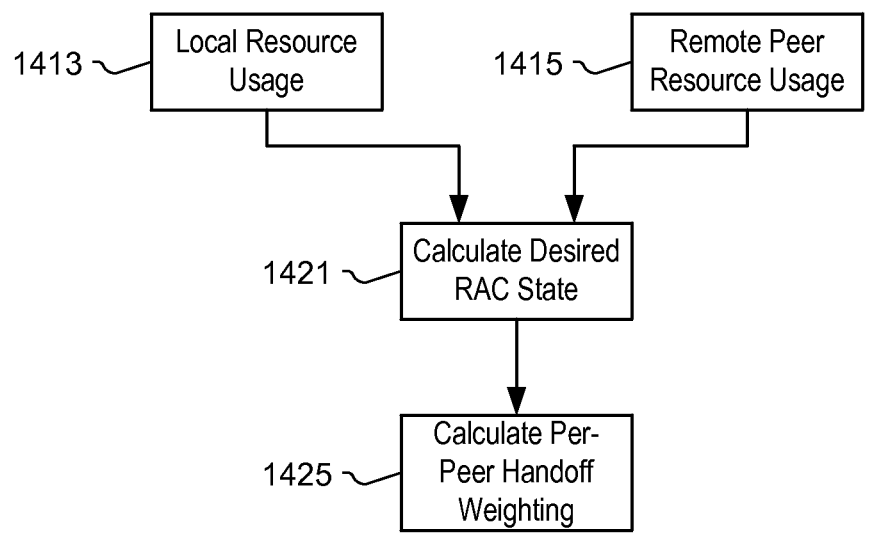
FIG. 14 is a flowchart illustrating reception and processing of information for load balancing in accordance with aspects of the invention.

FIG. 14 is a flowchart illustrating reception and processing of information for load balancing in accordance with aspects of the invention. The reception and processing of information for load balancing may be performed, for example, by the small eNB of FIG. 2. Examples of balanced resources include connection resource usage, physical resource block usage, transport network loading, and hardware loading.

The eNB may, based on current loads, perform real-time dynamic cell reconfiguration. The load balancing can use local resource usage information 1413 and resource usage information from peer cells 1415. The resource usage information from peer cells can be received in status reports from the peer cells.

In step 1421, the eNB analyzes the resource usage information to calculate a desired radio admission control (RAC) state. If the desired RAC state requires changes, the eNB makes RAC configuration changes.

In step 1425, the eNB analyzes the resource usage information to calculate desired handover weighting. The handover may be on a per-peer basis. If the desired handover weights require changes, the eNB makes associated configuration changes. The handover weights may include a local weight of hand-out and a remote weight of hand-in. For load balancing, the eNB can increase the hand-out weight as the local load increases. This encourages user equipment on the cell edge to hand-out sooner. The eNB also can decrease the hand-in weight as the load of the associated peer cell increases. The deceased weight discourages handover to loaded cells.

Figure 15:
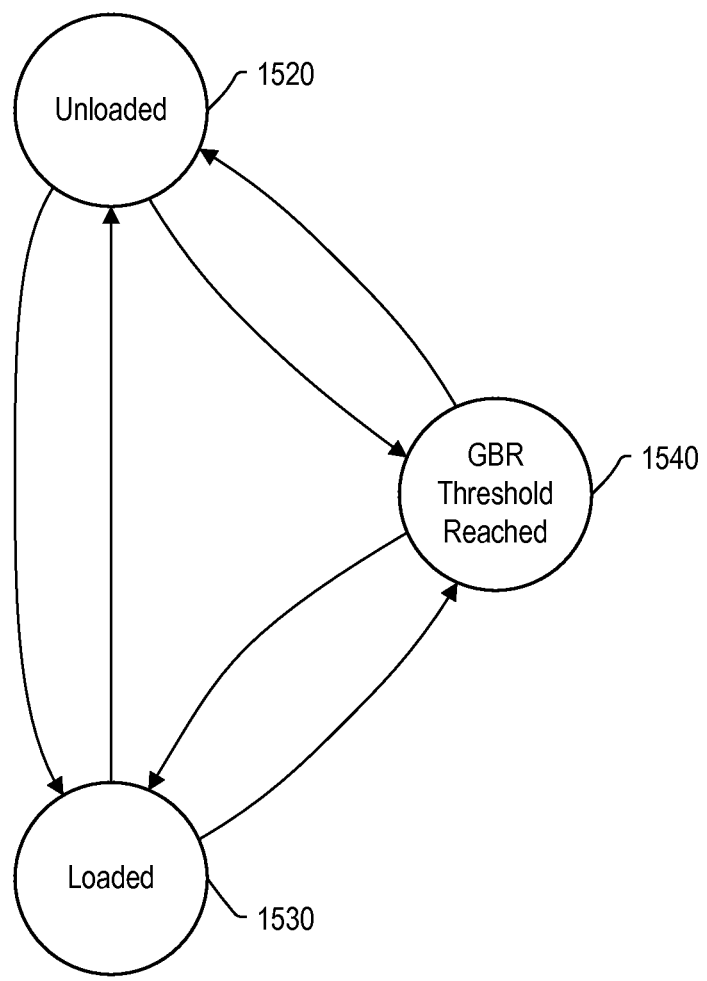
FIG. 15 is a state diagram of load balancing in accordance with aspects of the invention.

FIG. 15 is a state diagram of load balancing in accordance with aspects of the invention. The load balancing may be performed, for example, by the small eNB of FIG. 2. The states may be used with the process of FIG. 14.

The load balancing illustrated in FIG. 15 includes three RAC states: an unloaded state 1520, a loaded state 1530, and a GBR disallowed state 1540. In the unloaded state 1520, the cell is marked as unbarred and any user equipment is allowed admission. In the GBR disallowed state 1540, user equipments are allowed admission but new GBR bearers are not allowed. In the loaded state 1530, cell is marked as barred and user equipments will not be allowed admission and should not attempt to initiate new connections with the eNB.

The eNB may transition between the load balancing states based on traffic loading. The eNB may, for example, generally move to the unloaded state 1520 when the traffic level is low, move to the loaded state 1530 with the traffic level is too high for any additional traffic, and move to the GBR disallowed state 1540 when the traffic level is too high for any additional GBR traffic but still low enough for best-effort traffic.

The small cell eNBs described herein can perform various functions to control random access channel (RACH) operations to improve wireless communications network performance. An eNB may, for example, use an RACH preamble power control process to reduce user equipment transmission power thereby reducing inter-cell interference and also conserving user equipment battery power. An eNB may also use a preamble set selection process to avoid or reduce overlap with neighbor cells. An eNB may also use a preamble splitting process to balancing of dedicated and shared preambles to dynamically react to the types of RACH loads. An eNB may also use a PRACH configuration process to avoid or reduce the amount of overlap with neighbor cells.

Figure 16:
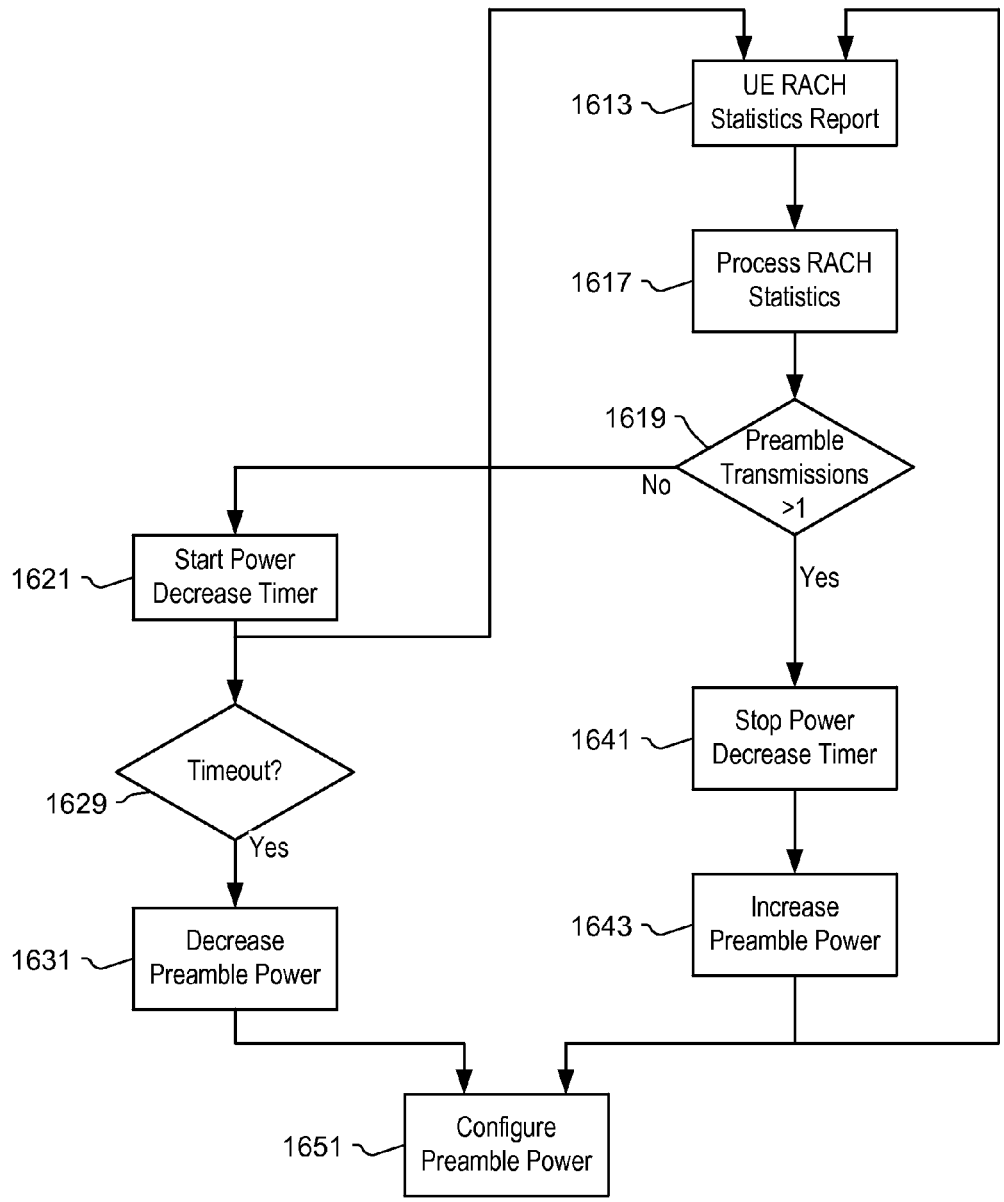
FIG. 16 is a flowchart illustrating an RACH preamble power control process in accordance with aspects of the invention.

FIG. 16 is a flowchart illustrating a RACH preamble power control process in accordance with aspects of the invention. The process may be performed, for example, by the small eNB of FIG. 2.

In step 1613, the small cell eNB receives a RACH statistics report from a user equipment. The RACH statistics report includes the number of RACH preambles sent before successful completion. The user equipment may, for example, send the RACH statistics report in response to a request from the small cell eNB. In step 1617, the small cell eNB analyzes the received RACH statistics report.

In step 1619, the small cell eNB determines whether the number of RACH preambles sent by the user equipment is more than one. If the number of RACH preambles sent is more than one, the process continues to step 1641; otherwise, the process continues to step 1621.

In step 1621, the small cell eNB starts a power decrease timer. Since the RACH was successful after one attempt, it may be appropriate to decrease the preamble power. The process then returns to step 1613 to receive further RACH statistics reports. The process also continues to step 1629 to wait for expiration of the power decrease timer.

In step 1641, the small cell eNB stops the power decrease timer. Since the RACH was not successful after one attempt, it may be appropriate to increase the preamble power. In step 1643, the preamble power is increased. The process then returns to step 1613 to receive further RACH statistics reports. The process also continues to step 1651 to effect the new preamble power configuration.

In step 1629, when the power decrease timer expires, the process continues to step 1631. The power decrease timer may expire after a fixed period of time passes without step 1641 occurring. In step 1631, the preamble power is decreased. The process then continues to step 1651 to effect the new preamble power configuration.

Figure 17:
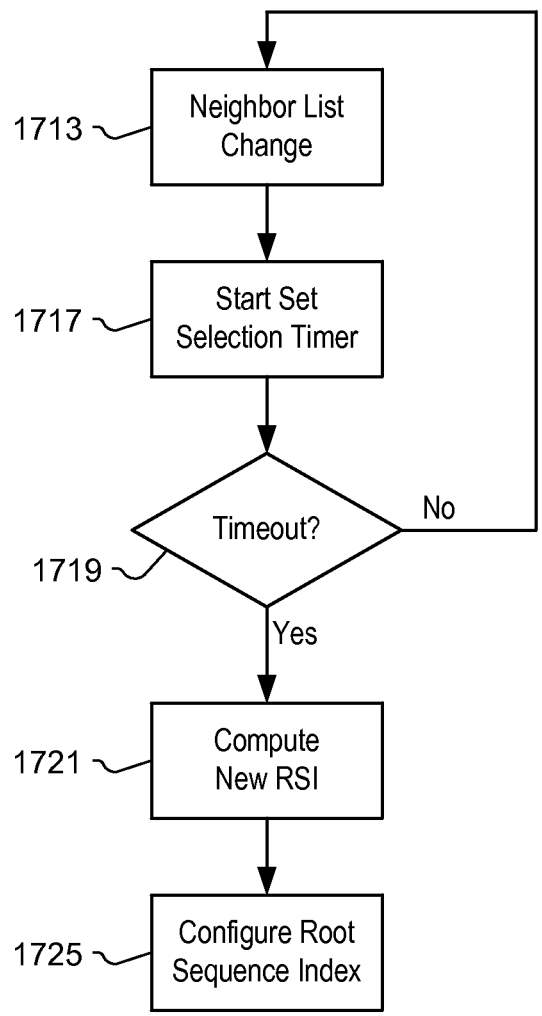
FIG. 17 is a flowchart illustrating an RACH preamble set selection process in accordance with aspects of the invention.

FIG. 17 is a flowchart illustrating a preamble set selection process in accordance with aspects of the invention. The process may be performed, for example, by the small eNB of FIG. 2 and in conjunction with the RACH preamble power control process illustrated in FIG. 16.

The small cell eNB, in step 1713, establishes that there has been a change to its neighbor list. The neighbor list may be changed, for example, by the processes described with reference to FIGS. 5, 9, and 10. In the step 1717, a set selection timer is started (if not previously started). The set selection timer can reduce the number of preamble set reselections performed when multiple neighbor changes occur in quick succession.

In step 1719, the process determines whether the set selection timer has expired. The set selection timer may expire after a fixed period of time passes without a change to the neighbor list occurring. If the set selection timer has expired, the process continues to step 1721; otherwise, the process returns to step 1713.

In step 1721, a new root sequence index (RSI) is determined. The small cell eNB may loop through all of its neighbors and selects an optimal RSI. The process then continues to step 1725 to effect the new root sequence index configuration.

Figure 18:
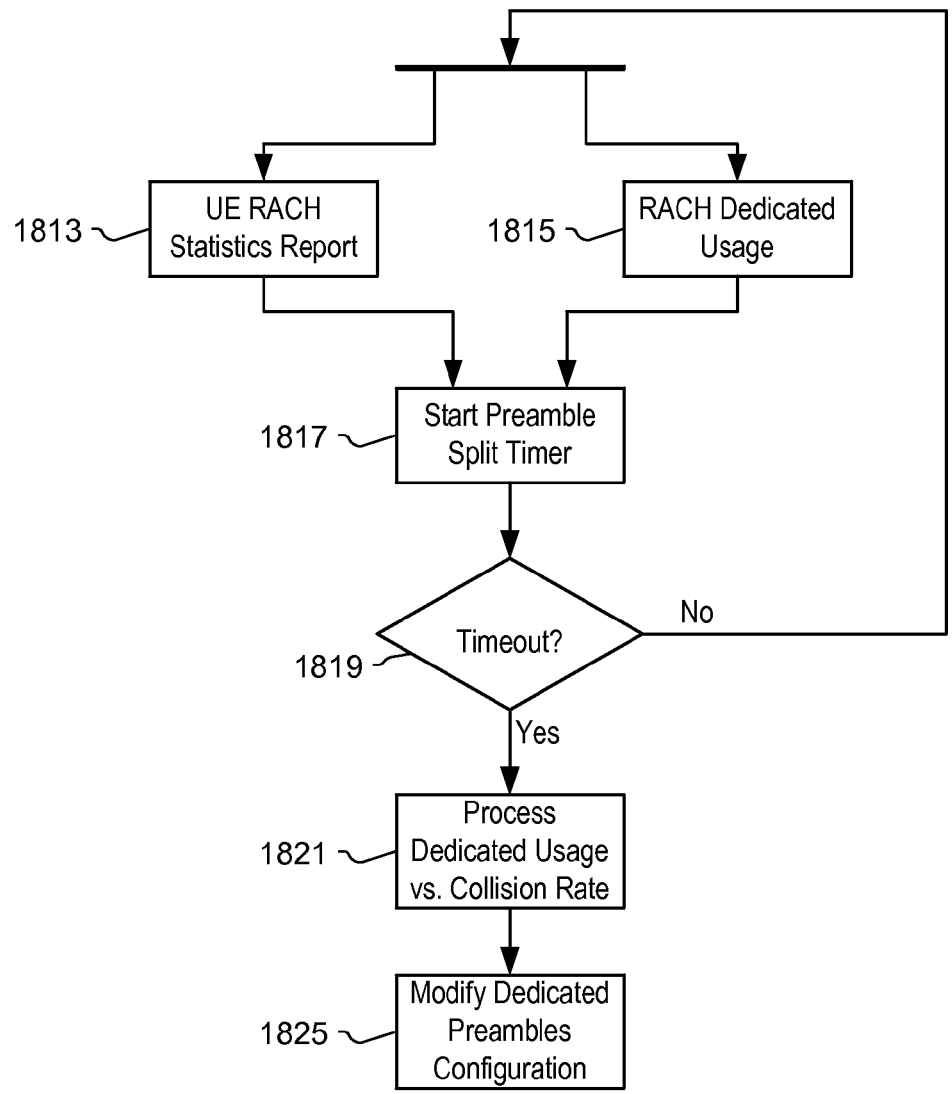
FIG. 18 is a flowchart illustrating an RACH preamble splitting process in accordance with aspects of the invention.

FIG. 18 is a flowchart illustrating a preamble splitting process in accordance with aspects of the invention. The process may be performed, for example, by the small eNB of FIG. 2 and in conjunction with the RACH preamble power control process illustrated in FIG. 16 and the preamble set selection process illustrated in FIG. 17. The preamble split is may be expressed as a percentage of preambles that are dedicated.

In step 1813, the small cell eNB receives a RACH statistics report from a user equipment. The RACH statistics report includes, for example, the number of preambles sent prior to successful access to the eNB and the number of contention resolution failures prior to successful access to the eNB. In step 1813, the small cell eNB receives a message with an RACH dedicated preamble from a user equipment.

After either or both of step 1813 and step 1815, in step 1817, a preamble split timer is started (if not previously started). The preamble split timer can reduce the number of preamble split configuration changes performed when multiple RACH statistics report or dedicated preambles uses occur in quick succession.

In step 1819, the process determines whether the preamble split timer has expired. The preamble split timer may expire after a fixed period of time passes without either event 1813 or 1815 occurring. If the preamble split timer has expired, the process continues to step 1821; otherwise, the process returns to step 1813 and step 1815.

In step 1821, the small cell eNB processes the information from step 1813 and step 1815. Depending, for example, on the dedicated preamble usage and collision rate statistics gathered, a new allocation of dedicated preambles may be determined. The process then continues to step 1825 to effect the new preamble split configuration.

Figure 19:
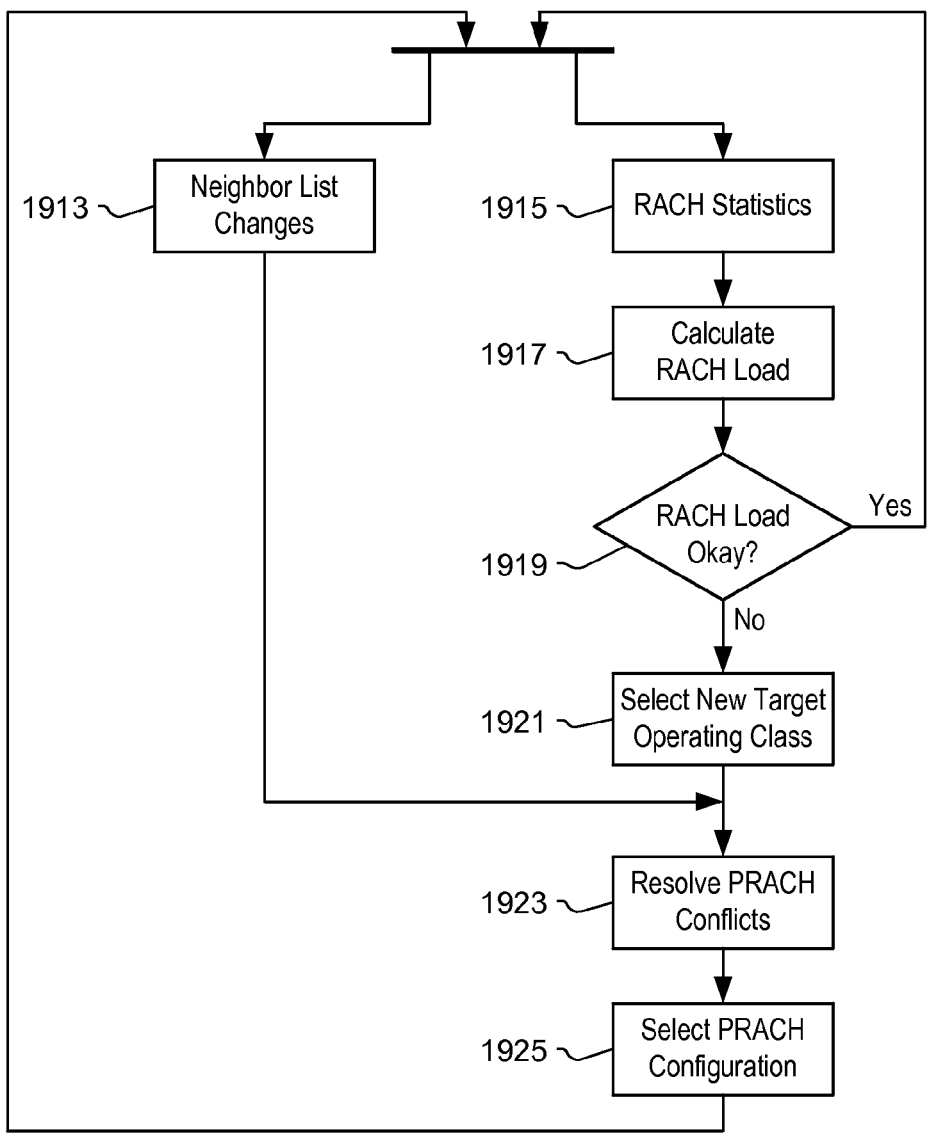
FIG. 19 is a flowchart illustrating a PRACH configuration process in accordance with aspects of the invention.

FIG. 19 is a flowchart illustrating a physical random access channel (PRACH) configuration process in accordance with aspects of the invention. The process may be performed, for example, by the small eNB of FIG. 2 and in conjunction with the RACH preamble power control process illustrated in FIG. 16, the preamble set selection process illustrated in FIG. 17, and the preamble splitting process illustrated in FIG. 18.

The small cell eNB, in step 1913, establishes that there has been a change to its neighbor list. The process continues to step 1923.

In step 1915, the small cell eNB receives a RACH statistics report from a user equipment. The RACH statistics report includes, for example, the number of preambles sent prior to successful access to the eNB and the number of contention resolution failures prior to successful access to the eNB. In step 1917, the small cell eNB calculates the RACH load using the information from step 1915.

In step 1919, the RACH load from step 1917 is compared to the current small cell eNB configuration (e.g., current RACH operating class). If the RACH load fits the current configuration, the process returns to step 1913 and step 1915; otherwise, the process continues to step 1921. In step 1921, the small cell eNB selected a new configuration that fits the current RACH load.

In step 1923, the small cell eNB resolves any PRACH conflicts created by the new configuration from step 1921 or the neighbor list change from step 1913. In step 1923, the small cell eNB selects a new PRACH configuration based on the preceding steps. The process then continues to step 1925 to effect the new PRACH configuration.

Figure 20:
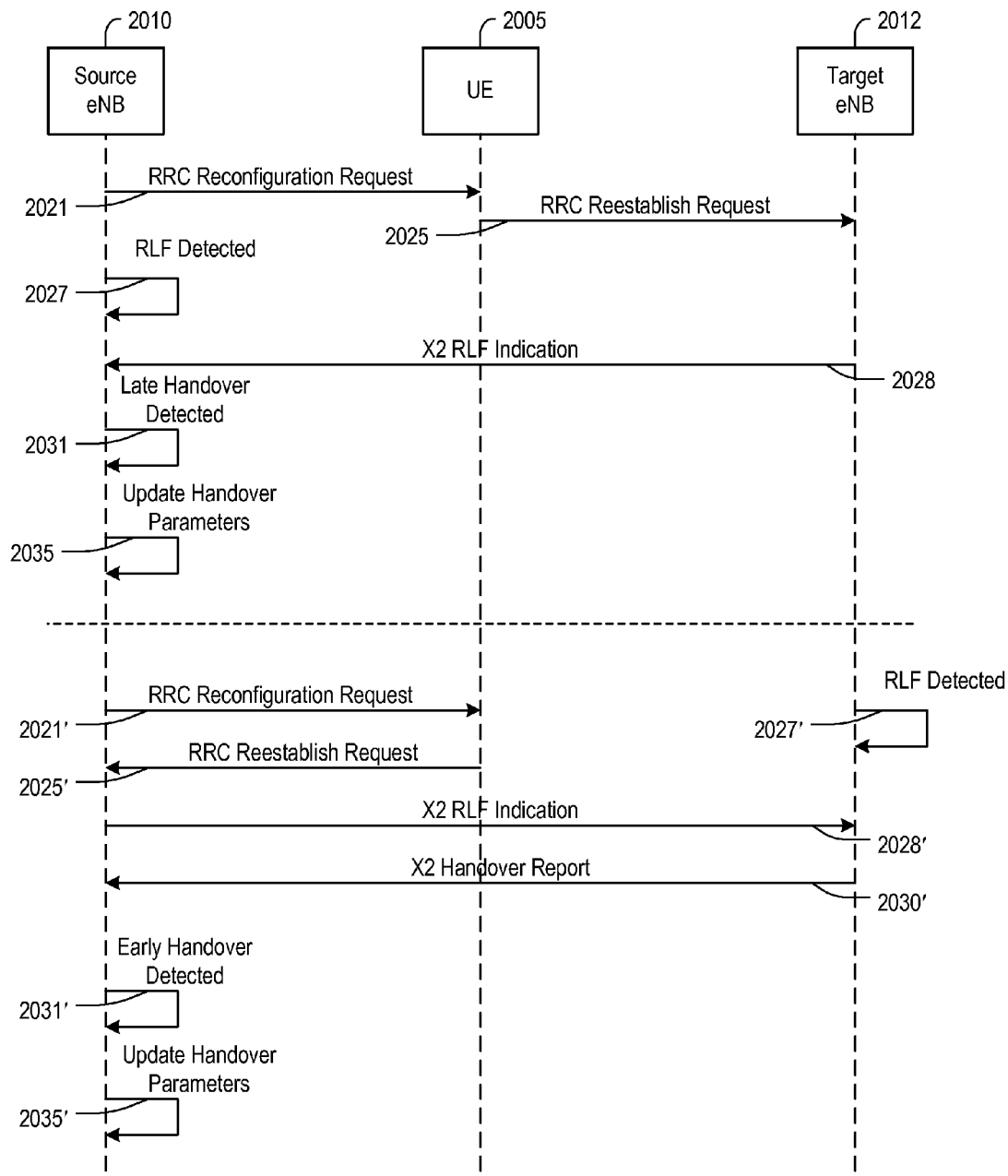
FIG. 20 is a flow diagram illustrating processes for mobility robustness in accordance with aspects of the invention.

FIG. 20 is a flow diagram illustrating processes for mobility robustness in accordance with aspects of the invention. The illustrated processes may be performed, for example, by the small cell eNBs of FIG. 2 operating in the wireless communication network of FIG. 1. The mobility robustness processes detect too-early and too-late handovers and adjust handover parameters accordingly.

A first variation of the illustrated handover process begins with the source small cell eNB 2010 sending an RRC reconfiguration request 2021 to the user equipment 2005. The RRC reconfiguration request 2021 instructs the user equipment 2005 to handover to the target small cell eNB 2012. The user equipment 2005 then sends an RRC reestablishment request 2025 to the target small cell eNB 2012. The source small cell eNB 2010 can detect a radio link failure 2027. In the case of a too-late handover, the RLF may occur when communication between the source small cell eNB 2010 and the user equipment 2005 are not complete but the user equipment 2005 is out of range of the source small cell eNB 2010.

The target small cell eNB 2012 sends an RLF indication 2028 to the source small cell eNB 2010 over the X2 interface. This may be triggered by the RRC reestablishment request 2025, which can include an indication from the user equipment of RLF failure.

When the source small cell eNB receives the RLF indication 2028, the small cell eNB can evaluate the related events (e.g., the RLF detection 2027) to determine that the RLF was caused by a too-late handover 1031. The source small cell eNB 2010 can then update its handover parameters 2035 to avoid future too-late handovers.

A second variation of the illustrated handover process begins with the source small cell eNB 2010 sending an RRC reconfiguration request 2021' to the user equipment 2005. The RRC reconfiguration request 2021' instructs the user equipment 2005 to handover to the target small cell eNB 2012. If the handover is early, the user equipment 2005 may not be able to communicate with the target small cell eNB 2012. The user equipment 2005 then sends an RRC reestablishment request 2025' to the target small cell eNB 2012.

The target small cell eNB 2012 can detect a radio link failure 2027' because except communication with the handed-over user equipment 2005 does not occur.

The source small cell eNB 2010 sends an RLF indication 2028' to the target small cell eNB 2012 over the X2 interface. This may be triggered by the RRC reestablishment request 2025', which can include an indication from the user equipment of RLF failure. The target small cell eNB 2012 can send a handover report 2030' in response to the RLF indications 2028'.

When the source small cell eNB 2010 receives the handover report 2030', the source small cell eNB 2010 can evaluate the related events (e.g., the RLF indication 2028') to determine that the RLF was caused by a too-early handover 1031'. The source small cell eNB 2010 can then update its handover parameters 2035' to avoid future too-early handovers.

Notably the message sequences for the too-early and too-late handover failures are unique and sufficient to identify both the reason for the failure and the eNB that caused the failure.

As described in this specification, various apparatuses and methods are described as working to optimize particular parameters, functions, or operations. This use of the term optimize does not necessarily mean optimize in a theoretical or global sense. Rather, the apparatuses and methods may work to improve performance using algorithms that are expected to improve performance in at least many common cases. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

Acronyms and Abbreviations

The foregoing description uses many terms, acronyms, and abbreviations that are common in the arts related to wireless communications. To aid those who may be less familiar with the relevant arts in understanding the disclosed systems and methods, the table below lists definitions for many acronyms and abbreviations used in this application.

| Term/Acronym | Definition |
| --- | --- |
| ACS | Automatic Configuration System |
| API | Application Programming Interface |
| BSS | Base Station System |
| CDMA | Code Division Multiple Access |
| CGI | Cell Global Identity |
| eNB | Evolved Node B |
| ECGI | Enhanced Cell Global Identity |
| EPC | Evolved Packet Core |
| ERDSS | External Radio Device Support System |
| FAPI | Femto Application Platform Interface |
| GBR | Guaranteed Bit Rate |
| GUI | Graphical User Interface |
| HOM | Handover Margin |
| HSS | Home Subscriber Server |
| IPM | Inter Pico cell Management |
| IDE | Integrated Development Environment |
| LTE | Long Term Evolution |
| MME | Mobility Management Entity |
| MP | Mobility Processor |
| NMM | Network Monitor Mode |
| NMS | Network Management System |
| OAM | Operations, Administration, and Maintenance |
| OAM-GUI | Operations, Administration, and Maintenance Graphical UI |
| OAM-TR069 | Operations, Administration, and Maintenance TR069 Protocol |
| OAM-TUI | Operations, Administration, and Maintenance Textual UI |
| OMA | Open Mobile Alliance |
| P-GW | Packet Gateway |
| PCI | Physical Cell Identity |
| PRACH | Physical Random Access Channel |
| PRB | Physical Resource Block |
| QoS | Quality of Service |
| RAB | Radio Access Bearer |
| RAC | Radio Admission Control |
| RACH | Random Access Channel |
| RAT | Radio Access Technology |
| RF | Radio Frequency |
| RLF | Radio Link Failure |
| RRC | Radio Resource Control |
| RSRP | Reference Signal Received Power |
| S-GW | Servicing Gateway |
| SCM | Source Code Management |
| SDD | Software Design Description |
| SDP | Software Development Plan |
| SGSN | Serving GPRS Support Node |
| SIB | System Information Block |
| SN | Sequence Number |
| SON | Self-Organizing Network |
| SRS | Software Requirements Specification |
| S1AP | S1 Application |
| TAI | Tracking Area Identity |
| TUI | Terminal User Interface |
| TTT | Time-To-Trigger |
| UE | User Equipment |
| UML | Unified Modeling Language |
| UMTS | Universal Mobile Telecommunications Service |
| X2AP | X2 Application |

What is claimed is:

1. A base station, comprising:
one or more radio modules configured to establish wireless communications with user equipments using one or more cells;
a sniffer module configured to detect signals from other base stations;
a backhaul interface module configured to send data to a network and receive data from the network;
a processor; and
a memory coupled to the processor and configured to store instructions that when executed by the processor cause the base station to:
communicate with an automatic configuration system using information from an initial configuration file and download further configuration information from the automatic configuration system;
connect to a gateway using the further configuration information;
scan, using the sniffer module, for received radio signals to detect neighboring base stations;
update a neighbor list using information about the detected neighboring base stations;
connect to the detected neighboring base stations and receive lists of neighboring base stations from the detected neighboring base stations;
add information from the received lists of neighboring base stations to the neighbor list;
determine a physical cell identity using the neighbor list; and
transmit, using at least one of the one or more radio modules, from the base station using the physical cell identity.

2. The base station of claim 1, wherein the gateway is a home enhanced node B gateway.

3. The base station of claim 1, wherein connecting to the detected neighboring base stations comprises requesting information about the detected neighboring base stations from a mobility management entity and using the information about the detected neighboring base stations received from the mobility management entity to establish connections with the detected neighboring base stations.

4. The base station of claim 1, wherein the instructions further comprise instructions that when executed cause the base station to process peer reports received from the user equipments and modify operations of the base station based on the peer reports.

5. The base station of claim 4, wherein the instructions further comprise instructions that when executed cause the base station to:
transmit a received signal strength indicator (RSSI) measurement request to a target one of the neighbor base stations; and
adjust a transmit power level using RSSI measurement information from the target one of the neighbor base stations,
wherein the RSSI measurement information is received in one of the peer reports.

6. The base station of claim 1, wherein the instructions further comprise instructions that when executed cause the base station to process user equipment reports received from the user equipments and modify operations of the base station based on the user equipment reports.

7. The base station of claim 6, wherein in the user equipment reports include a report with information about signal strength of another base station measured by one of the user equipments, and wherein the instructions further comprise instructions that when executed cause the base station to add the other base station to the neighbor list based on the information about signal strength of the other base station measured by one of the user equipments.

8. The base station of claim 6, wherein in the user equipment reports include a report with information about random access channel (RACH) statistics, and wherein the instructions further comprise instructions that when executed cause the base station to adjust RACH preamble power based on the information about random access channel statistics.

9. The base station of claim 8, wherein the RACH statistics include the number of RACH preambles sent the respective user equipment before successful completion.

10. The base station of claim 6, wherein in the user equipment reports include a report with information about RACH dedicated preamble usage and collision statistics, and wherein the instructions further comprise instructions that when executed cause the base station to adjust an allocation of dedicated RACH preambles based on the information about RACH dedicated preamble usage and collision statistics.

11. The base station of claim 6, wherein in the user equipment reports include a report with information about RACH statistics including information about RACH loading, and wherein the instructions further comprise instructions that when executed cause the base station to select a physical random access channel (PRACH) configuration based on the information about RACH statistics.

12. The base station of claim 1, wherein the instructions further comprise instructions that when executed cause the base station to add a base station to the neighbor list based on receiving an X2 connection from a base station that is not included in the neighbor list.

13. The base station of claim 1, wherein the instructions further comprise instructions that when executed cause the base station to add a base station to the neighbor list based on a user equipment being handed over to the base station from a base station that is not included in the neighbor list.

14. The base station of claim 1, wherein the instructions further comprise instructions that when executed cause the base station to blacklist one of the base stations in the neighbor list based on failures detected in handovers of user equipments to the one of the base stations.

15. The base station of claim 1, wherein the instructions further comprise instructions that when executed cause the base station to perform load balancing.

16. The base station of claim 15, wherein the load balancing comprises analyzing resource usage information to determine handover weights, the resource usage information including information about resources of the base station and resource usage information from neighbor base stations.

17. The base station of claim 1, wherein the instructions further comprise instructions that when executed cause the base station to detect a too-late handover over one of the user equipments and adjust handover weights based on the detected a too-late handover.

18. A method for use in deploying a small cell base station in a self-organizing network, the method comprising:
communicating with an automatic configuration system using information from an initial configuration file and downloading further configuration information from the automatic configuration system;
connecting to a gateway using the further configuration information
scanning for received radio signals to detect neighboring base stations;
updating a neighbor list using information about the detected neighboring base stations;

connecting to the detected neighboring base stations and receiving lists of neighboring base stations from the detected neighboring base stations;

adding information from the received lists of neighboring base stations to the neighbor list;

determining a physical cell identity using the neighbor list; and establishing wireless communications with user equipments in a cell using the physical cell identity.

19. The method of claim 18, wherein the gateway is a home enhanced node B gateway.

20. The method of claim 18, wherein connecting to the detected neighboring base stations comprises requesting information about the detected neighboring base stations from a mobility management entity and using the information about the detected neighboring base stations received from the mobility management entity to establish connections with the detected neighboring base stations.

21. The method of claim 18, further comprising:

transmitting a received signal strength indicator (RSSI) measurement request to a target one of the neighbor base stations; and adjusting a transmit power level using RSSI measurement information received in a peer report from the target one of the neighbor base stations.

22. The method of claim 18, further comprising receiving a user equipment report from one of the user equipments, the user equipment report including information about signal strength of another base station measured by the one of the user equipments, and adding the other base station to the neighbor list based on information about signal strength of the base station measured by one of the user equipments.

23. The method of claim 18, further comprising adding a base station to the neighbor list based on a user equipment being handed over to the base station from a base station that is not included in the neighbor list.

24. The method of claim 18, further comprising load balancing including analyzing resource usage information to determine handover weights, the resource usage information including information about resources of the base station and resource usage information from neighbor base stations.

25. The method of claim 18, further comprising detecting a too-late handover or too-early handover of one of the user equipments and adjust handover weights based on the detected the too-late or too-early handover.

26. A base station, comprising:

one or more radio modules configured to establish wireless communications with user equipments using one or more cells;

a sniffer module configured to detect signals from other base stations;

a backhaul interface module configured to send data to a network and receive data from the network;

a processor; and a memory coupled to the processor and configured to store instructions that when executed by the processor cause the base station to:

scan, using the sniffer module, for received radio signals to detect neighboring base stations;

update a neighbor list using information about the detected neighboring base stations;

request information about the detected neighboring base stations from a mobility management entity;

connect to the detected neighboring base stations using the information about the detected neighboring base stations received from the mobility management entity and receive lists of neighboring base stations from the detected neighboring base stations;

connect to the detected neighboring base stations and receive lists of neighboring base stations from the detected neighboring base stations;

add information from the received lists of neighboring base stations to the neighbor list;

determine a physical cell identity using the neighbor list; and transmit, using at least one of the one or more radio modules, from the base station using the physical cell identity.

\* \* \* \* \*